US010109066B2

(12) United States Patent
Lee et al.

(10) Patent No.: US 10,109,066 B2
(45) Date of Patent: *Oct. 23, 2018

(54) OPTICAL TRACKING SYSTEM, AND METHOD FOR CALCULATING POSTURE AND LOCATION OF MARKER PART IN OPTICAL TRACKING SYSTEM

(71) Applicants: KOH YOUNG TECHNOLOGY INC., Seoul (KR); KYUNGPOOK NATIONAL UNIVERSITY INDUSTRY-ACADEMIC COOPERATION FOUNDATION, Daegu (KR)

(72) Inventors: Hyun Ki Lee, Daegu (KR); You Seong Chae, Daegu (KR); Min Young Kim, Daegu (KR)

(73) Assignees: KOH YOUNG TECHNOLOGY INC., Seoul (KR); KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/314,672

(22) PCT Filed: May 29, 2015

(86) PCT No.: PCT/KR2015/005444
§ 371 (c)(1),
(2) Date: Nov. 29, 2016

(87) PCT Pub. No.: WO2015/183050
PCT Pub. Date: Dec. 3, 2015

(65) Prior Publication Data
US 2017/0200278 A1 Jul. 13, 2017

(30) Foreign Application Priority Data
May 29, 2014 (KR) .................. 10-2014-0065178

(51) Int. Cl.
*G06K 9/00* (2006.01)
*G06T 7/246* (2017.01)
*G06T 7/73* (2017.01)
*G06T 7/80* (2017.01)

(52) U.S. Cl.
CPC ............... *G06T 7/246* (2017.01); *G06T 7/73* (2017.01); *G06T 7/80* (2017.01); *G06T 2207/10056* (2013.01); *G06T 2207/30204* (2013.01)

(58) Field of Classification Search
CPC .. G06T 7/246; G06T 7/73; G06T 7/80; G06T 2207/30204; G06T 2207/10056
See application file for complete search history.

(56) References Cited

U.S. PATENT DOCUMENTS 9,478,030 B1 * 10/2016 Lecky .................... G06Q 10/08
9,832,441 B2 * 11/2017 Osman .................... H04N 9/87
(Continued)

FOREIGN PATENT DOCUMENTS

JP 2000-149025 5/2000
JP 2012-069126 4/2012
(Continued)

OTHER PUBLICATIONS

You Seong Chae et al., "An Image Based Coordinate Tracking System Using Afocal Optics for Surgical Navigation"; Progress in Optomechatronic Technologies, Oct. 28, 2013, pp. 141-152.
(Continued)

*Primary Examiner* — Yon Couso
(74) *Attorney, Agent, or Firm* — Kile Park Reed & Houtteman PLLC

(57) ABSTRACT

An optical tracking system includes a marker part, an image forming part, and a processing part. The marker part
(Continued)

includes a pattern having particular information and a first lens. First and second image forming parts include second and third lenses and first and second image forming units. The processing part determines the posture of the marker part from a first coordinate conversion formula between a coordinate on the pattern surface of a pattern and first pixel coordinate on a first image of the pattern, and a second coordinate conversion formula between a coordinate on the pattern surface of the pattern and second pixel coordinate on a second image of the pattern, the second coordinate conversion formula including the rotation conversion between the first pixel coordinate and the second pixel coordinate and tracks the marker part by using the posture of the marker part.

13 Claims, 18 Drawing Sheets

(56) References Cited

U.S. PATENT DOCUMENTS

2008/0125896 A1  5/2008  Troy et al.
2011/0017826 A1  1/2011  Mohan et al.
2012/0075424 A1  3/2012  Kawamoto et al.

FOREIGN PATENT DOCUMENTS

KR  10-2007-0122271  12/2007
KR  10-2011-0121863  11/2011
KR  10-1262181  5/2013

OTHER PUBLICATIONS

"Progress in Optomechatronic Technologies" Springer for Research and Development, Proceedings of the 2013 International Symposium on Optomechatronic Technologies, Oct. 28-30, 2013, pp. 1-6.
R. Hartley et al., "Epipolar Geometry and the Fundamental Matrix"; Multiple View Geometry in Computer VI, Cambridge University Press, Jan. 1, 2003, pp. 239-261.
International Search Report for International Application No. PCT/KR2015/005444, dated Sep. 3, 2015.
Chinese Office Action for Chinese Application No. 201580027892.7 and English Translation dated Jul. 4, 2018.
European Office Action for European Application No. 15 800 560.3, dated Aug. 29, 2018.

* cited by examiner

OPTICAL TRACKING SYSTEM, AND METHOD FOR CALCULATING POSTURE AND LOCATION OF MARKER PART IN OPTICAL TRACKING SYSTEM

TECHNICAL FIELD

The present invention relates to an optical tracking system and a method for calculating the posture and location of a marker part of the optical tracking system. More particularly, the present invention relates to an optical tracking system and a method for calculating the posture and location of a marker part of the optical tracking system by using pattern information.

BACKGROUND ART

In general, an optical tracking system is used to track the position of a predetermined object. For example, the optical tracking system may be utilized to track a target in real time in equipment, such as a surgical robot.

The optical tracking system generally includes a plurality of markers attached to a target and image forming units for forming images by using light emitted by the markers, and mathematically calculates information acquired from the image forming units to thereby obtain position information or the like.

However, the conventional optical tracking system includes a plurality of markers, which increases the size of the equipment, and may be thus inappropriate in the case of tracking that requires fine precision.

Therefore, an optical tracking system, which can track the markers accurately and easily while simplifying the markers, is required.

SUMMARY

Therefore, an aspect of the present invention is to provide an optical tracking system that can track markers accurately and easily while simplifying the markers.

Another aspect of the present invention is to provide a method of calculating the posture and location of a marker part of an optical tracking system that can be applied to the optical tracking system above.

An optical tracking system, according to an exemplary embodiment of the present invention, may include: a marker part that is configured to include a pattern that has particular information and a first lens that is spaced apart from the pattern and has a first focal length; a first image forming part that is configured to include a second lens that has a second focal length and a first image forming unit that is spaced apart from the second lens and on which a first image of the pattern is formed by the first lens and the second lens; a second image forming part that is configured to include a third lens that has a third focal length and a second image forming unit that is spaced apart from the third lens and on which a second image of the pattern is formed by the first lens and the third lens; and a processing part that is configured to determine a posture of the marker part from a first coordinate conversion formula between a coordinate on a pattern surface of the pattern and a first pixel coordinate on the first image of the pattern and from a second coordinate conversion formula between the coordinate on the pattern surface of the pattern and a second pixel coordinate on the second image of the pattern, the second coordinate conversion formula including a rotation conversion between the first pixel coordinate and the second pixel coordinate, and is configured to track the marker part.

In an embodiment, the processing part may acquire: the first conversion matrix that converts a first coordinate corresponding to a coordinate on the pattern surface of the pattern to a second coordinate corresponding to a three-dimensional coordinate for the first lens of the marker part; the second conversion matrix that converts a third coordinate corresponding to a three-dimensional coordinate of the second coordinate for the second lens to a fourth coordinate corresponding to the first pixel coordinate on the first image of the pattern of the first image forming part; the third conversion matrix that is the same as the first conversion matrix and converts a fifth coordinate corresponding to a coordinate on the pattern surface of the pattern to a sixth coordinate corresponding to a three-dimensional coordinate for the first lens of the marker part; and the fourth conversion matrix that converts a seventh coordinate corresponding to a three-dimensional coordinate of the sixth coordinate for the third lens to an eighth coordinate corresponding to the second pixel coordinate on the second image of the pattern of the second image forming part, wherein the first coordinate conversion formula is defined to convert the first coordinate to the fourth coordinate while including the first conversion matrix and the second conversion matrix, and the second coordinate conversion formula is defined to convert the fifth coordinate to the eighth coordinate while including the third conversion matrix and the fourth conversion matrix, and wherein the processing part acquires, from the first coordinate conversion formula and the second coordinate conversion formula, a first posture definition matrix that defines the posture of the marker part with respect to the first image forming part.

For example, the first coordinate conversion formula may be defined by the following equation, $$s \begin{bmatrix} lu' \\ lv' \\ 1 \end{bmatrix} = [A_l][R_L][C] \begin{bmatrix} lu \\ lv \\ 1 \end{bmatrix}$$

wherein {(lu,lv) denotes the first coordinate, (lu',lv') denotes the fourth coordinate, [C] denotes the first conversion matrix, [$A_l$] denotes the second conversion matrix, [$R_L$] denotes the first posture definition matrix, and s denotes a proportional constant}, and the second coordinate conversion formula may be defined by the following equation, $$s \begin{bmatrix} ru' \\ rv' \\ 1 \end{bmatrix} = [A_r][R_R][C] \begin{bmatrix} ru \\ rv \\ 1 \end{bmatrix} = [A_r][R_{LR}][R_L][C] \begin{bmatrix} ru \\ rv \\ 1 \end{bmatrix}$$

wherein {(ru,rv) denotes the fifth coordinate, (ru',rv') denotes the eighth coordinate, [C] denotes the third conversion matrix, [$A_r$] denotes the fourth conversion matrix, [$R_R$] denotes the second posture definition matrix for defining the posture of the marker part with respect to the second image forming part, [$R_{LR}$] denotes a third posture definition matrix for defining a posture of the first image forming part with respect to the second image forming part, and s denotes a proportional constant}.

For example, the first conversion matrix and the third conversion matrix may be defined by the following equation, $$[C] = \begin{bmatrix} 1 & 0 & -u_c \\ 0 & 1 & -v_c \\ 0 & 0 & f_b \end{bmatrix}$$

wherein {$(u_c, v_c)$ denotes the coordinate of a center of the pattern, and $f_b$ denotes the first focal length}, and the second conversion matrix and the fourth conversion matrix may be defined by the following equation, $$[A] = \begin{bmatrix} -\dfrac{f_c}{pw} & 0 & u'_c \\ 0 & -\dfrac{f_c}{ph} & v'_c \\ 0 & 0 & 1 \end{bmatrix}$$

wherein {$(u'_c, v'_c)$ denotes the pixel coordinate on the image of the pattern corresponding to the center of the pattern, $f_c$ denotes the second focal length in the case of the second conversion matrix and denotes the third focal length in the case of the fourth conversion matrix, pw denotes a width of a pixel of the first image of the pattern in the case of the second conversion matrix and denotes a width of a pixel of the second image of the pattern in the case of the fourth conversion matrix, and ph denotes a height of a pixel of the first image of the pattern in the case of the second conversion matrix and denotes a height of a pixel of the second image of the pattern in the case of the fourth conversion matrix}.

In an embodiment, the processing part may acquire the first conversion matrix and the third conversion matrix by acquiring calibration values of $u_c$, $u_c$, and $f_b$ from three or more photographed images, and may acquire the second conversion matrix and the fourth conversion matrix by acquiring calibration values of $f_c$, pw, and ph by using the acquired data.

In an embodiment, the processing part may acquire a plurality of pieces of data on the first coordinate and the fourth coordinate and a plurality of pieces of data on the fifth coordinate and the eighth coordinate, and may acquire the first posture definition matrix by the following equation to which the plurality of pieces of the acquired data are applied, $$[R_L] = \begin{bmatrix} r_{11} & r_{12} & r_{13} \\ r_{21} & r_{22} & r_{23} \\ r_{31} & r_{32} & r_{33} \end{bmatrix}$$

$$\begin{bmatrix} LW_1 \\ RW_1 \\ \vdots \\ LW_n \\ RW_n \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

$$LW_i = \begin{bmatrix} \dfrac{f_c}{pw}lu_i & \dfrac{f_c}{pw}lv_i & \dfrac{f_c}{pw}f_b & 0 & 0 & 0 & (lu'_i - lu'_c)u_i & (lu'_i - lu'_c)v_i & (lu'_i - lu'_c)f_b \\ 0 & 0 & 0 & \dfrac{f_c}{ph}lu_i & \dfrac{f_c}{ph}lv_i & \dfrac{f_c}{ph}f_b & (lv'_i - lv'_c)u_i & (lv'_i - lv'_c)v_i & (lv'_i - lv'_c)f_b \end{bmatrix}$$

$$RW_i = \begin{bmatrix} A1r'_{11} + B1r'_{31} & C1r'_{11} + D1r'_{31} & E1r'_{11} + F1r'_{31} \\ A1r'_{12} + B1r'_{32} & C1r'_{12} + D1r'_{302} & E1r'_{12} + F1r'_{32} \\ A1r'_{13} + B1r'_{33} & C1r'_{13} + D1r'_{33} & E1r'_{13} + F1r'_{33} \\ A2r'_{11} + B2r'_{31} & C2r'_{11} + D2r'_{31} & E2r'_{11} + F2r'_{31} \\ A2r'_{12} + B2r'_{32} & C2r'_{12} + D2r'_{302} & E2r'_{12} + F2r'_{32} \\ A2r'_{13} + B2r'_{33} & C2r'_{13} + D2r'_{33} & E2r'_{13} + F2r'_{33} \end{bmatrix}$$

$$A1 = -\dfrac{f_c}{pw}ru_i, \quad B1 = ru_i(ru'_c - ru'_i), \quad C1 = -\dfrac{f_c}{pw}rv_i,$$

$$D1 = rv_i(ru'_c - ru'_i), \quad E1 = -\dfrac{f_c}{pw}f_b, \quad F1 = f_b(ru'_c - ru'_i)$$

$$A2 = -\dfrac{f_c}{ph}ru_i, \quad B2 = ru_i(rv'_c - rv'_i), \quad C2 = -\dfrac{f_c}{ph}rv_i,$$

-continued $$D2 = rv_i(rv'_c - rv'_i), E2 = -\frac{f_c}{ph}f_b, F2 = f_b(rv'_c - rv'_i)$$

$$[R_{LR}] = \begin{bmatrix} r'_{11} & r'_{12} & r'_{13} \\ r'_{21} & r'_{22} & r'_{23} \\ r'_{31} & r'_{32} & r'_{33} \end{bmatrix}$$

wherein $\{(lu_1,lv_1), \ldots, (lu_n,lv_n)$ denote data on the first coordinates, $(lu'_1,lv'_1), \ldots, (lu'_n,lv'_n)$ denote data on the fourth coordinates, $(lu'_c,lv'_c)$ denotes the pixel coordinates on the first image of the pattern corresponding to the center of the pattern, $(ru_1rv_1), \ldots, (ru_n,rv_n)$ denote data on the fifth coordinate, $(ru'_1,rv'_1), \ldots, (ru'_n,rv'_n)$ denote data on the eighth coordinate, and $(ru'_c,rv'_c)$ denotes the pixel coordinate on the second image of the pattern corresponding to the center of the pattern$\}$.

In an embodiment, the processing part may determine the location of the marker part from the third coordinate conversion formula for the second coordinate and the fourth coordinate and from the fourth coordinate conversion formula for the sixth coordinate and the eighth coordinate, and may track the marker part by using the determined location of the marker part.

For example, the third coordinate conversion formula may be defined by the following equation, $$s\begin{bmatrix} u'_1 \\ v'_1 \\ 1 \end{bmatrix} = A_L[I \mid 0]\begin{bmatrix} X \\ Y \\ Z \\ 1 \end{bmatrix}$$

wherein $\{(u'_1,v'_1)$ denotes the fourth coordinate, $(X,Y,Z)$ denotes the second coordinate, $[A_L]$ denotes the second conversion matrix, $[I]$ denotes an identity matrix in a 3×3 form, $[0]$ denotes a zero-matrix in a 3×1 form, and s denotes a proportional constant$\}$, and the fourth coordinate conversion formula may be defined by the following equation, $$s\begin{bmatrix} u'_2 \\ v'_2 \\ 1 \end{bmatrix} = A_R[R_{LR} \mid T]\begin{bmatrix} X \\ Y \\ Z \\ 1 \end{bmatrix}$$

wherein $\{(u'_2,v'_2)$ denotes the eighth coordinate, $(X,Y,Z)$ denotes the sixth coordinate, $[A_R]$ denotes the fourth conversion matrix, $[R_{LR}]$ denotes the third posture definition matrix in a 3×3 form, $[T]$ denotes a location conversion matrix in a 3×1 form, and s denotes a proportional constant$\}$.

In an embodiment, the processing part may: acquire a first central coordinate and a second central coordinate, each of which is the center of a field of view of the pattern that is photographed in the first and second image forming units, respectively; calibrate the location conversion matrix between the first image forming part and the second image forming part by using the acquired central coordinates; and acquire the location of the marker part by using the calibrated location conversion matrix.

In an embodiment, the processing part may acquire a scale factor by measuring the marker part at two or more locations, and may calibrate the location conversion matrix between the first image forming part and the second image forming part by using the acquired scale factor together with the acquired central coordinates.

According to an exemplary embodiment of the present invention, a method for calculating a posture and a location of a marker part of an optical tracking system is provided, which includes a marker part that includes a pattern that has particular information and a first lens that is spaced apart from the pattern and has a first focal length, a first image forming part that includes a second lens that has a second focal length and a first image forming unit that is spaced apart from the second lens and on which a first image of the pattern is formed by the first lens and the second lens, and a second image forming part that includes a third lens that has a third focal length and a second image forming unit that is spaced apart from the third lens and on which a second image of the pattern is formed by the first lens and the third lens, and which calculates the posture of the marker part for tracking the marker part. The method for calculating the posture and the location of the marker part of the optical tracking system may include: acquiring a first conversion matrix that converts a first coordinate corresponding to a coordinate on a pattern surface of the pattern to a second coordinate corresponding to a three-dimensional coordinate for the first lens of the marker part, the second conversion matrix that converts a third coordinate corresponding to a three-dimensional coordinates of the second coordinate for the second lens to a fourth coordinate corresponding to a first pixel coordinate on the first image of the pattern of the first image forming part, the third conversion matrix that is the same as the first conversion matrix and converts a fifth coordinate corresponding to a coordinate on the pattern surface of the pattern to a sixth coordinate corresponding to a three-dimensional coordinate for the first lens of the marker part, and the fourth conversion matrix that converts a seventh coordinate corresponding to a three-dimensional coordinate of the sixth coordinate for the third lens to an eighth coordinate corresponding to a second pixel coordinate on the second image of the pattern of the second image forming part; and acquiring a posture definition matrix for defining the posture of the marker part from a first coordinate conversion formula that converts the first coordinate to the fourth coordinate while including the first conversion matrix and the second conversion matrix and from a second coordinate conversion formula that converts the fifth coordinate to the eighth coordinate while including the third conversion matrix and the fourth conversion matrix.

In an embodiment, the method for calculating the posture and the location of the marker part of the optical tracking system may further include: acquiring a first central coordinate and a second central coordinate, each of which is the center of a field of view of the pattern that is photographed in the first and second image forming units, respectively; calibrating the location conversion matrix between the first image forming part and the second image forming part by using the acquired central coordinates; and acquiring the location of the marker part by using the calibrated location conversion matrix.

In an embodiment, the method for calculating the posture and location of a marker part of an optical tracking system may further include acquiring a scale factor by measuring the marker part at two or more locations before calibrating the location conversion matrix, wherein the location conversion matrix between the first image forming part and the second image forming part may be calibrated by using the acquired scale factor together with the acquired data in the calibrating of the location conversion matrix.

According to the present invention, in the optical tracking system for tracking a marker part, the marker part can be miniaturized while including a pattern of particular information to enable the tracking, and the posture and the location of the marker part can be determined more accurately by modeling the optical system of the marker part and the image forming part with the coordinate conversion formula and by configuring the optical system in stereo. Therefore, it is possible to accurately track the marker part by a simpler and easier method.

In addition, since the location of the marker part can be determined more accurately by modeling the marker part in a stereo structure, which has been miniaturized while including the pattern of particular information, it is possible to accurately track the marker part by a simpler and easier method.

DETAILED DESCRIPTION

Figure 1:
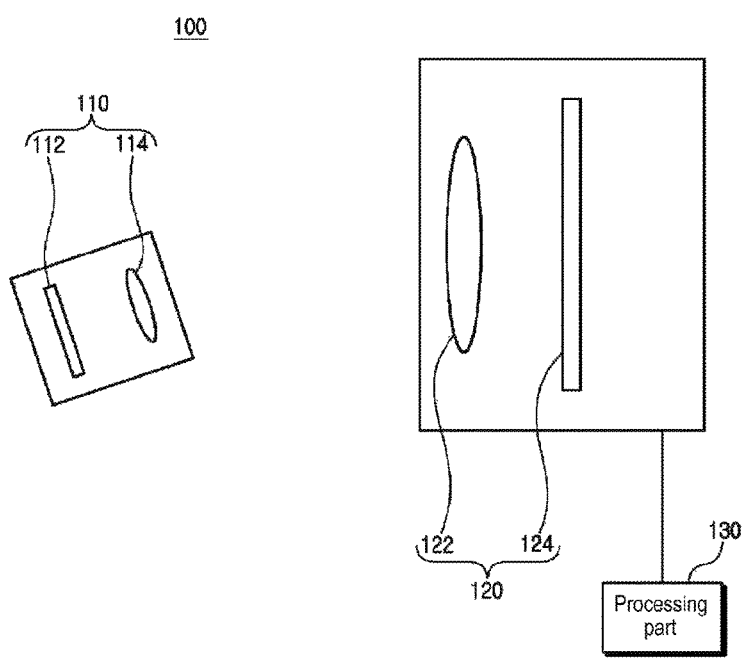
FIG. 1 is a conceptual diagram illustrating an optical tracking system, according to an embodiment of the present invention.

Although the present invention may be variously modified and may have a variety of forms, particular embodiments will be shown in the drawings and will be described in the specification. However, this is not intended to limit the present invention to particular disclosed forms, and it should be understood that the particular embodiments may encompass all modifications, equivalents, and substitutes that are included in the spirit and scope of the present invention.

Although the terms "first" or "second" may be used to describe various elements, the elements are not limited to the terms. The terms above will be used only to distinguish one element from other elements. For example, the first element may be named as the second element without departing from the scope of the present invention, and vice versa.

The terms that are used in the present specification are just intended to describe particular embodiments, and are not intended to limit the present invention. A single element expressed in the specification will be construed to encompass a plurality of elements unless the context clearly indicates otherwise. In the present specification, it should be understood that the term "include" or "have" is intended to indicate the existence of characteristics, numbers, steps, operations, elements, parts, or a combination thereof that are described in the specification, and is not intended to exclude the possibility of the existence or addition of one or more other characteristics, numbers, steps, operations, elements, parts, or a combination thereof.

Unless otherwise defined, all terms including technical and scientific terms, which are used herein, have the same meaning that is commonly understood by those skilled in the art.

The terms that are defined in the general dictionaries shall be construed to have the same meaning in the context of the related art, and shall not be construed as an ideal or excessively formal meaning unless clearly defined in the present specification.

Hereinafter, preferred embodiments of the present invention will be described in detail with reference to the accompanying drawings.

FIG. 1 is a conceptual diagram illustrating an optical tracking system, according to an embodiment of the present invention.

Referring to FIG. 1, the optical tracking system 100, according to an exemplary embodiment of the present invention, includes a marker part 110, an image forming part 120, and a processing part 130.

The marker part 110 includes a pattern 112 and a first lens 114.

The pattern 112 has particular information. For example, the particular information of the pattern may be recognized by the image forming part 120, which will be described later, for tracking, and may include one-dimensional patterns, such as bar codes, or two-dimensional patterns, such as QR codes.

The first lens 114 is spaced apart from the pattern 112, and has a first focal length. For example, the distance between the first lens 114 and the pattern 112 may be the same as the first focal length of the first lens 114 in order for the image forming part 120, which will be described later, to form an image of the pattern 112 and to track the pattern 112 from a distance. In this case, a bundle of rays with respect to the pattern 112, which pass through the first lens 114, may be parallel. The first lens 114, for example, may perform a similar function as an object lens of a microscope.

The marker part 110 may not include a light source. In this case, the marker part 110 may be utilized as a passive marker that uses light located outside of the marker part 110. On the other hand, the marker part 110 may include a light source. In this case, the marker part 110 may be utilized as an active marker that uses its own light.

The image forming part 120 includes a second lens 122 and an image forming unit 124.

The second lens 122 has a second focal length. The second lens 114, for example, may perform a similar function as an eyepiece of a microscope.

The image forming unit 124 is spaced apart from the second lens 122 and the image of the pattern 112 is formed on the image forming unit 124 by the first lens 114 and the second lens 122. For example, the distance between the image forming unit 124 and the second lens 122 may be the same as the second focal length of the second lens 122 in order to form an image for a bundle of rays with respect to the pattern 112, which pass through the first lens 114 to be parallel. For example, the image forming unit 124 may include an image sensor, such as a CCD (charge coupled device), a CMOS (complementary metal-oxide semiconductor), or the like.

The processing part 130 determines the posture of the marker part 110 from a coordinate conversion formula between the coordinate on the pattern surface of the pattern 112 and a pixel coordinate on the image of the pattern 112. The processing part 130 tracks the marker part 110 by using the determined posture of the marker part 110. The processing part 130, for example, may include a computer, or more specifically, may include a central processing unit (CPU).

Hereinafter, a system modeling process that becomes the base of functions of the processing part 130 and a process of determining the posture of the marker part 110 according thereto will be described in more detail with reference to the drawings.

Figure 2:
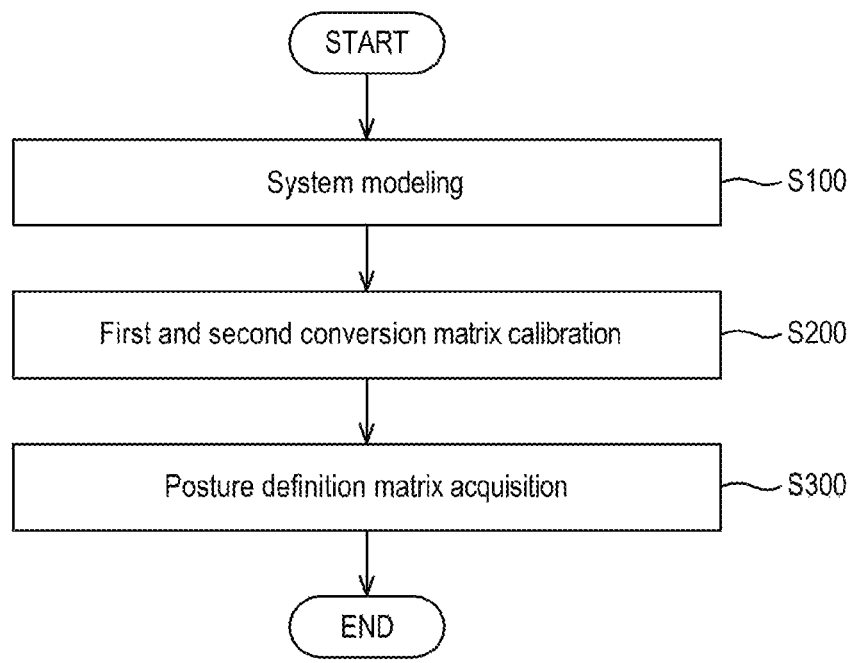
FIG. 2 is a flowchart schematically showing a problem-solving process that is necessary for the processing part of the optical tracking system of FIG. 1 in determining the posture of the marker part.

FIG. 2 is a flowchart schematically showing a problem-solving process that is necessary for the processing part of the optical tracking system of FIG. 1 in determining the posture of the marker part.

Referring to FIG. 2, the system modeling is conducted with respect to the optical tracking system 100, which has the configuration as described above (S100).

In the optical tracking system 100 as shown in FIG. 1, since the coordinate conversion between the coordinate on the pattern surface of the pattern 112 and the pixel coordinate on the image of the pattern 112 is made by the optical system of the optical tracking system 100, the coordinate conversion formula may be configured by modeling the coordinate conversion according to the optical system of the optical tracking system 100. At this time, the modeling of the coordinate conversion according to the optical system of the optical tracking system 100 may be made by each optical system of the marker part 110 and the image forming part 120 and by a relationship therebetween.

Then, in the coordinate conversion formula that is acquired as a result of the system modeling, the first and second conversion matrices, which will be described later, are calibrated (S200).

When defining the coordinate on the pattern surface of the pattern 112 shown in FIG. 1 as the first coordinate, the three-dimensional local coordinate of the first coordinate for the first lens 114 as the second coordinate, the three-dimensional local coordinate of the second coordinate for the second lens 122 as the third coordinate, and the pixel coordinate on the image of the pattern 112 of the image forming part 120 as the fourth coordinate, the first conversion matrix converts the first coordinate to the second coordinate, and the second conversion matrix converts the third coordinate to the fourth coordinate.

Although the coordinate conversion formula acquired as a result of the system modeling is determined as the equation of various parameters of the optical systems of the marker part 110 and the image forming part 120 shown in FIG. 1, the parameters may not be accurately acquired or values thereof may vary with the mechanical arrangement state. Therefore, a more accurate system modeling can be made by calibrating the first conversion matrix and the second conversion matrix.

Next, a posture definition matrix is acquired by using the calibration result (S300).

Here, the posture refers to the direction in which the marker part 110 faces, and the posture definition matrix provides information about the posture of the marker part 110 so that roll, pitch, and yaw of the marker part 110 may be recognized from the posture definition matrix.

Hereinafter, each operation of FIG. 2 will be described in more detail with reference to the drawings.

Figure 3:
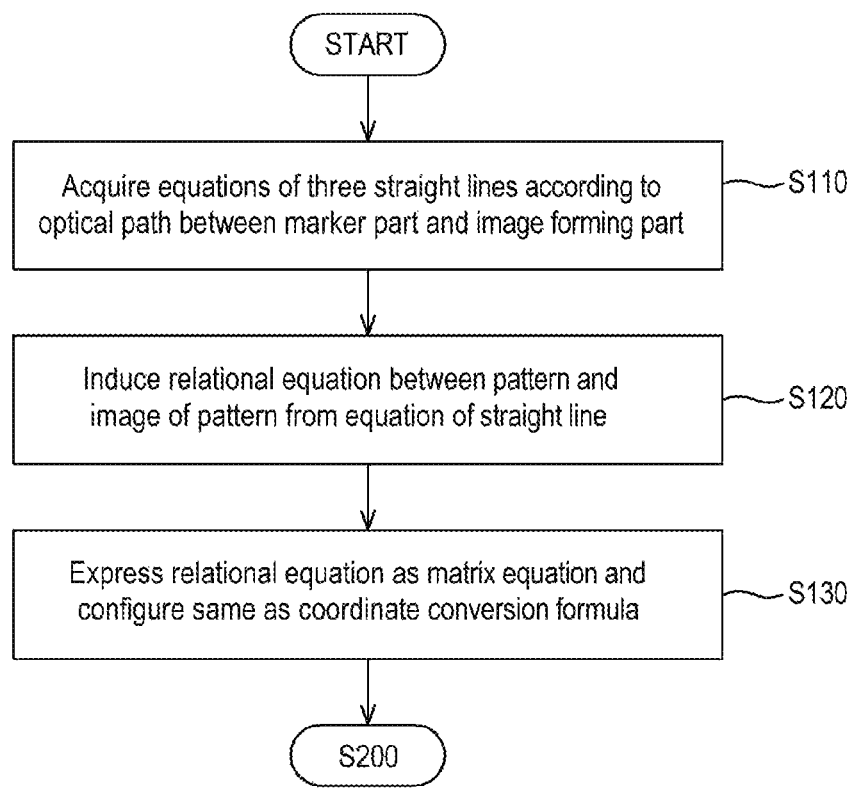
FIG. 3 is a flowchart illustrating a process of system modeling in the problem-solving process of FIG. 2.
Figure 4:
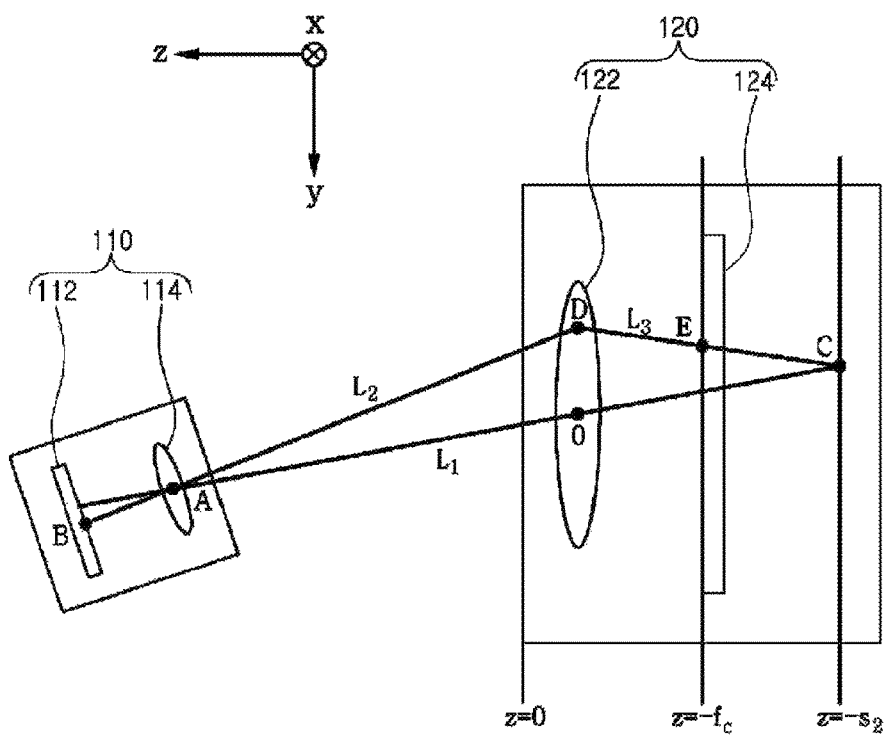
FIG. 4 is a conceptual diagram for explaining the process of system modeling in FIG. 3.

FIG. 3 is a flowchart illustrating a process of system modeling in the problem-solving process of FIG. 2, and FIG. 4 is a conceptual diagram for explaining the process of system modeling in FIG. 3.

Referring to FIGS. 3 and 4, first, equations for three straight lines are acquired according to optical paths between the marker part 110 and the image forming part 120 (S110).

More specifically, the central point of the first lens 114 is referred to as the first central point A and the central point of the second lens 122 is referred to as the second central point O, while point B refers to a certain point on the pattern 112. A ray with respect to a certain point B passes straight through the first central point A of the first lens 114, and the ray that has passed through the first central point A reaches the second lens 122 at point D. Then, the ray is refracted by the second lens 122 at the point D to then form an image on the image forming unit 124 at point E. In addition, a ray passes straight through the first central point A of the first lens 114 and the second central point O of the second lens 122 to then meet the extension line of the line segment DE at point C.

At this time, the linear equation for the line segment AO (or the line segment AC), the linear equation for the line segment AD, and the linear equation for the line segment DC are defined as L1, L2, and L3, respectively, as shown in FIG. 4.

In a world coordinate system, the coordinate of the first central point A is configured as (X,Y,Z), and the coordinate of the second central point O is configured as the origin (0,0,0). Since the coordinate of the second central point O of the second lens 122 is configured as the origin (0,0,0), the three-dimensional local coordinate system for the second lens 122 is the same as the world coordinate system.

In addition, the coordinate of a certain point (corresponding to the point B) on the pattern 112 is configured as (u,v), and the coordinate of the central point of the pattern 112 is configured as $(u_c, v_c)$. Further, the coordinate of a pixel of the image (corresponding to the point E) of the pattern 112, which is formed on the image forming unit 124, is configured as (u',v'). The coordinates (u,v) and $(u_c,v_c)$, for example, may be configured based on the left upper side of pattern 112, and the coordinate (u',v'), for example, may be configured based on the left upper side of the image of pattern 112.

Meanwhile, when the image forming part 120 is positioned in the focal length $f_c$ of the second lens 122, the z-axis coordinate of the image forming unit 124 may be $-f_c$.

The equations of the three straight lines may be acquired in sequence by using information above.

The equation of the straight line L1 is acquired from the line segment AO, and the position of the point C is acquired from the same. The equation of the straight line L2 is acquired from the line segment AB, and the position of the point D is acquired from the same. The equation of the straight line L3 is acquired from the line segment DC. At this time, since the world coordinates of the point A and the point O are given, the equations of the three straight lines may be obtained by recognizing only the world coordinate of the point B.

When the posture definition matrix for defining the posture of the marker part 110 is defined as a 3*3 matrix [R] and the components of the matrix [R] are defined as $r_{11}$, $r_{12}$, $r_{13}$, $r_{21}$, $r_{22}$, $r_{23}$, $r_{31}$, $r_{32}$, and $r_{33}$, respectively, the world coordinate of the point B may be determined as $(r_{11}u+r_{12}v+r_{13}f_b+X, r_{21}u+r_{22}v+r_{23}f_b+Y, r_{31}u+r_{32}v+r_{33}f_b+Z)$ that is converted from the pattern coordinate (u,v) of the point B based on the matrix [R] and the focal length $f_b$ of the first lens 114.

Accordingly, it is possible to acquire the equations of the three straight lines from the world coordinates of the points A, O, and B.

Subsequently, the relational equation between the pattern 112 and the image of the pattern 112 is induced from the acquired equations of the three straight lines (S120).

The position of the point E (the world coordinate of the point E) may be acquired from the equation of the straight line L3 obtained above so that the pixel coordinate (u',v') of the point E may be obtained from the same.

According to this, since the pixel coordinate (u',v') of the point E may be expressed as the coordinate (u,v) on the pattern of the point B, the relational equation between the pattern 112 and the image of the pattern corresponding to the point E may be determined.

Next, the relational equation is expressed as a matrix equation in order to thereby configure the same as the coordinate conversion formula (S130).

The relational equation may be expressed as a matrix equation as shown in Equation 1 below, and such a matrix equation for the coordinate conversion may be configured as the coordinate conversion formula.

$$s \begin{bmatrix} u'_i \\ v'_i \\ 1 \end{bmatrix} = [A][R][C] \begin{bmatrix} u_i \\ v_i \\ 1 \end{bmatrix} \quad \text{(Equation 1)}$$

$$= \begin{bmatrix} -\frac{f_c}{pw} & 0 & u'_c \\ 0 & -\frac{f_c}{ph} & v'_c \\ 0 & 0 & 1 \end{bmatrix} \begin{bmatrix} r_{11} & r_{12} & r_{13} \\ r_{21} & r_{22} & r_{23} \\ r_{31} & r_{32} & r_{33} \end{bmatrix}$$

$$\begin{bmatrix} 1 & 0 & -u_c \\ 0 & 1 & -v_c \\ 0 & 0 & f_b \end{bmatrix} \begin{bmatrix} u_i \\ v_i \\ 1 \end{bmatrix}$$

$(s = r_{31}u_i + r_{32}v_i + r_{33}f_b)$

Here, (u,v) denotes the first coordinate, (u',v') denotes the fourth coordinate, [C] refers to the first conversion matrix, [A] refers to the second conversion matrix, [R] refers to the posture definition matrix, $(u_c,v_c)$ denotes the coordinate of the center of the pattern on the pattern surface, $f_b$ denotes the first focal length, $f_c$ denotes the second focal length, pw denotes the width of a pixel of the image of the pattern, ph denotes the height of a pixel of the image of the pattern, and i of $(u_i,v_i)$ and $(u'_i, v'_i)$ indicates the predetermined i-th pattern.

It can be seen that the coordinate conversion formula is made by the product of the first and second conversion matrices, which are described in FIG. 1, and the posture definition matrix.

More specifically, as described in FIG. 1, when defining the coordinate on the pattern surface of the pattern 112 as the first coordinate (u,v), the three-dimensional local coordinate of the first coordinate for the first lens 114 as the second coordinate, the three-dimensional local coordinate (equal to the world coordinate) of the second coordinate for the second lens 122 as the third coordinate, and the pixel coordinate on the image of the pattern 112 of the image forming part 120 as the fourth coordinate (u',v'), it can be seen that the coordinate conversion formula is conceptually expressed as [A][R][C], which is the product of the first conversion matrix [C] for converting the first coordinate to the second coordinate, the posture definition matrix [R] for converting the second coordinate to the third coordinate, and the second conversion matrix [A] for converting the third coordinate to the fourth coordinate.

Next, the operation S200 of calibrating the first and second conversion matrices in the coordinate conversion formula that is acquired as a result of the system modeling will be described in more detail with reference to the drawings.

The calibration is carried out first with respect to the second conversion matrix, and is then carried out with respect to the first conversion matrix.

Figure 5:
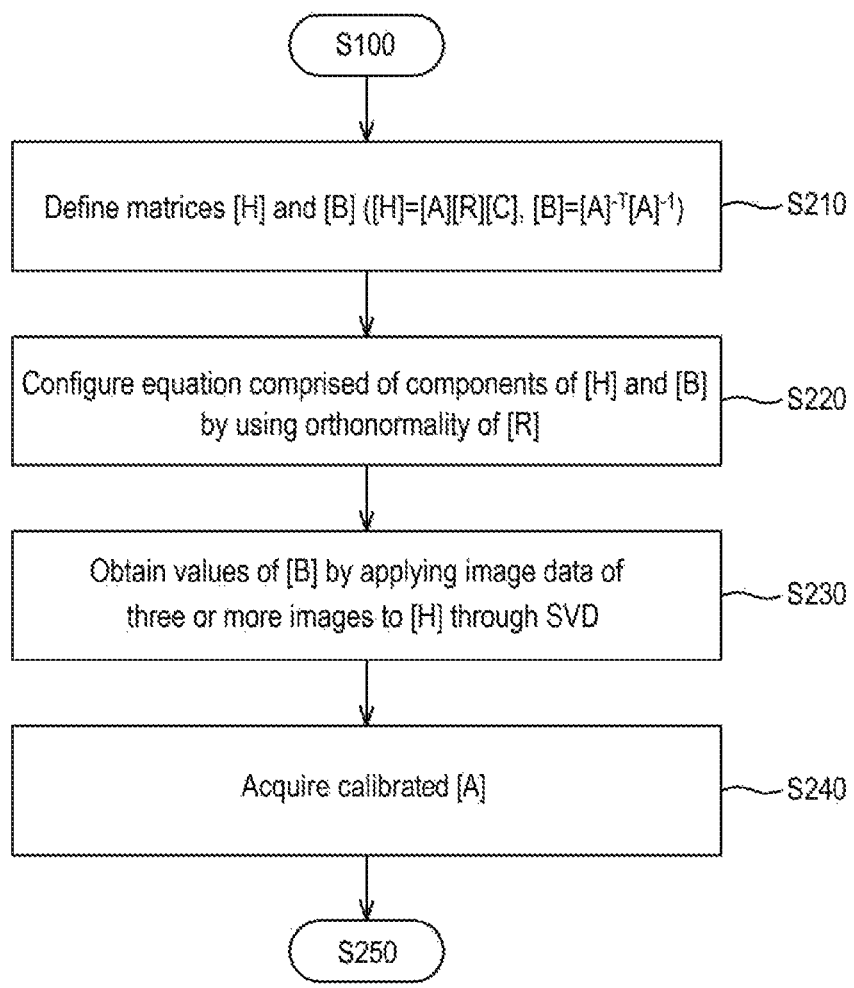
FIG. 5 is a flowchart illustrating a process of calibrating a second conversion matrix in the problem-solving process of FIG. 2.

FIG. 5 is a flowchart illustrating a process of calibrating the second conversion matrix in the problem-solving process of FIG. 2.

Referring to FIG. 5, first, a matrix [B] and a matrix [H] are defined to facilitate the mathematical analysis for the calibration (S210).

More specifically, the matrix [B] may be defined by using the second conversion matrix [A] as shown in Equation 2, and the matrix [H] may be defined by using the first conversion matrix [C], the second conversion matrix [A], and the posture definition matrix [R] as shown in Equation 3.

$$[B] = [A]^{-T} * [A]^{-1} \quad \text{(Equation 2)}$$

$$[H] = [A][R][C] \quad \text{(Equation 3)}$$

Here, all of the matrixes [A], [B], [C], [H], and [R] are in the form of a 3*3 matrix, and it may be expressed that [H]=[h1,h2,h3] and [R]=[r1,r2,r3].

Equation 4 is obtained by multiplying both sides of Equation 3 by $A^{-1}$.

$$A^{-1}[h_1 h_2 h_3] = [r_1 r_2 T] \quad \text{(Equation 4)}$$

Then, the equation comprised of the components of [H] and [B] is configured by using the orthonormality of the matrix [R] (S220).

More specifically, the matrix [B] may be defined as shown in Equation 5 by using the orthonormality of the posture definition matrix [R] corresponding to a rotation matrix.

$$[B] = \begin{bmatrix} \frac{1}{\alpha^2} & 0 & -\frac{u'_c}{\alpha^2} \\ 0 & \frac{1}{\beta^2} & -\frac{v'_c}{\beta^2} \\ -\frac{u'_c}{\alpha^2} & -\frac{v'_c}{\beta^2} & \frac{u'^2_c}{\alpha^2} + \frac{v'^2_c}{\beta^2} + 1 \end{bmatrix} = \begin{bmatrix} B_{11} & 0 & B_{13} \\ 0 & B_{22} & B_{23} \\ B_{13} & B_{23} & B_{33} \end{bmatrix} \quad \text{(Equation 5)}$$

Here, $\alpha=-f_c/pw$, $\beta=-f_c/ph$, $f_c$ refers to the focal length of the second lens 122 of the image forming part 120, and Pw and ph refer to the width and the height of a pixel, respectively.

Column vectors b and $v_{ij}$ are defined as shown in Equation 6 by using non-zero components of the matrix [B].

$$b = [B_{11} B_{22} B_{13} B_{23} B_{33}]^T$$

$$v_{ij} = [h_{i1}h_{j1}, h_{i2}h_{j2}, h_{i3}h_{j1} + h_{i1}h_{j3}, h_{i3}h_{j2} + h_{i2}h_{j3}, h_{i3}h_{j3}]^T \quad \text{(Equation 6)}$$

Equation 7 may be acquired by using the orthonormality of the matrix [R] with respect to Equation 6.

$$\begin{bmatrix} v_{12}^T \\ (v_{11} - v_{22})^T \end{bmatrix} b = 0 \quad \text{(Equation 7)}$$

$$\begin{bmatrix} h_{11}h_{21}, h_{12}h_{22}, h_{13}h_{21} + h_{11}h_{23}, h_{13}h_{22} + h_{12}h_{23}, h_{13}h_{23} \\ h_{11}h_{11} - h_{21}h_{21}, h_{12}h_{12} - h_{22}h_{22}, h_{13}h_{11} + h_{11}h_{13} - \\ (h_{23}h_{21} + h_{21}h_{23}), h_{13}h_{12} + h_{12}h_{13} - (h_{23}h_{22} + h_{22}h_{23}), \\ h_{13}h_{13} - h_{23}h_{23} \end{bmatrix}$$

$$\begin{bmatrix} B_{11} \\ B_{22} \\ B_{13} \\ B_{23} \\ B_{33} \end{bmatrix} = 0$$

Next, values of the matrix [B] are obtained by applying data on three or more images to the matrix [H] (S230).

More specifically, after applying three or more images to Equation 7, the column vector b may be obtained by using a method such as singular value decomposition (SVD).

Once the column vector b is obtained, all components of the matrix [B] may be recognized.

Next, the calibrated matrix [A] is eventually acquired (S240).

More specifically, when all components of the matrix [B] are given, $v'_c$, $\alpha$, $\beta$, and $u'_c$ may be obtained through Equation 8 ($\lambda$ and $\gamma$ are expressed as parameters).

$$v'_c = \frac{B_{12}B_{13} - B_{11}B_{23}}{B_{11}B_{22} - B_{12}^2} \quad \text{(Equation 8)}$$

$$\alpha = \sqrt{\frac{\lambda}{B_{11}}}, \quad \beta = \sqrt{\frac{\lambda B_{11}}{B_{11}B_{22} - B_{12}^2}}$$

$$u'_c = \frac{\gamma v'_c}{\beta} - \frac{B_{13}\alpha^2}{\lambda}$$

$$\lambda = B_{33} - \frac{[B_{13}^2 + v'_c(B_{12}B_{13} - B_{11}B_{23})]}{B_{11}}$$

$$\gamma = -B_{12}\alpha^2\beta/\lambda$$

Therefore, all components of the matrix [A] may be obtained from Equation 9.

$$[A] = \begin{bmatrix} \alpha & 0 & u'_c \\ 0 & \beta & v'_c \\ 0 & 0 & 1 \end{bmatrix}; \left( \alpha = -\frac{f_c}{pw}, \beta = -\frac{f_c}{ph.} \right) \quad \text{(Equation 9)}$$

Next, the calibration of the first conversion matrix [C] is made by using the second conversion matrix [A] that has been previously calibrated.

Figure 6:
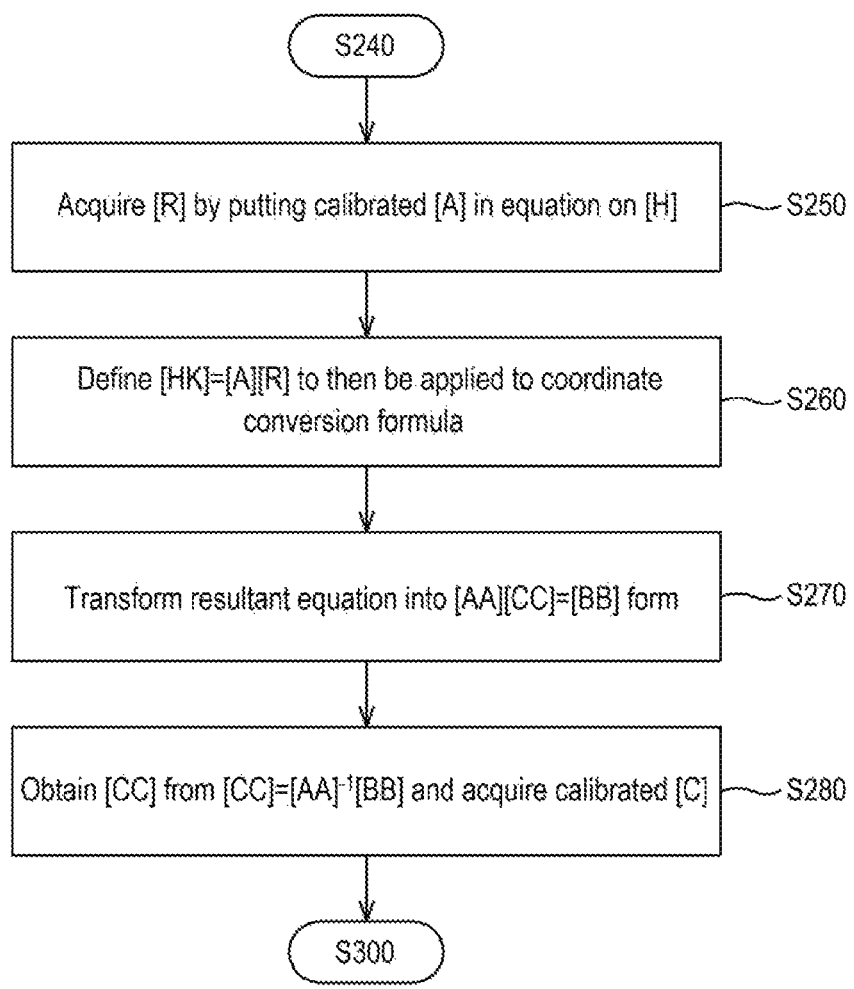
FIG. 6 is a flowchart illustrating a process of calibrating a first conversion matrix in the problem-solving process of FIG. 2.

FIG. 6 is a flowchart illustrating a process of calibrating the first conversion matrix in the problem-solving process of FIG. 2.

Referring to FIG. 6, the matrix [R] is obtained by putting the calibrated matrix [A] in the equation on matrix [H] (S250).

More specifically, Equation 10 is acquired by putting the second conversion matrix [A] of Equation 9 in Equation 3 and by calculating [R][C] of Equation 1.

$$[H] = [A][R][C] \quad \text{(Equation 10)}$$

$$= [A][RC]$$

$$= \begin{bmatrix} \alpha & 0 & u'_c \\ 0 & \beta & v'_c \\ 0 & 0 & 1 \end{bmatrix} \begin{bmatrix} r_{11} & r_{12} & -u_c r_{11} - v_c - u_c r_{12} + f_b r_{13} \\ r_{21} & r_{22} & -u_c r_{21} - v_c - u_c r_{22} + f_b r_{23} \\ r_{31} & r_{32} & -u_c r_{31} - v_c - u_c r_{32} + f_b r_{33} \end{bmatrix}$$

$$= [h_1 \quad h_2 \quad h_3]$$

If the matrix [R] is replaced by [R]=[r1 r2 r3] in Equation 10, [R] may be obtained for each column vector component from Equation 11.

$$r_1[A]^{-1}h_1, r_2=[A]^{-1}h_2, r_3=r_1 \times r_2 \quad \text{(Equation 11)}$$

Subsequently, a matrix [HK] is defined as [HK]=[A][R] to then be applied to the coordinate conversion formula (S260).

More specifically, the product of the matrix [A] and the matrix [R] is defined as the matrix [HK] to then be applied to the coordinate conversion formula of Equation 1 to have the components of the matrix [HK] and the matrix [C].

At this time, the matrix [HK] may be obtained by using the matrix [A] that is acquired in Equation 9 and the matrix

[R] that is acquired in Equation 11, and may be applied to the coordinate conversion formula of Equation 1 in order to thereby acquire Equation 12, which comprises of the components of the matrix [HK] and the matrix [C].

$$s\begin{bmatrix}u'\\v'\\1\end{bmatrix} = [A][R][C]\begin{bmatrix}u\\v\\1\end{bmatrix} = \quad\text{(Equation 12)}$$

$$[HK][C]\begin{bmatrix}u\\v\\1\end{bmatrix} = [HK]\begin{bmatrix}1 & 0 & -u_c\\0 & 1 & -v_c\\0 & 0 & f_b\end{bmatrix}\begin{bmatrix}u\\v\\1\end{bmatrix}$$

Next, the resultant equation is transformed into a form of [AA][CC]=[BB] (S270).

More specifically, the matrix comprised of only the components of the matrix [C] is defined as [CC] and is separated from the resultant equation in order to thereby transform the same into a form of [AA][CC]=[BB]. At this time, since the matrix [HK] is known, the matrix [AA], the matrix [BB], and the matrix [CC] may be defined as shown in Equation 13 by using the matrix [HK].

(Equation 13)

$$[AA] = \begin{bmatrix} HK(2,1) - HK(3,1)v'_i & HK(2,2) - HK(3,2)v'_i & HK(2,3) + HK(3,3)v'_i \\ -HK(1,1) + HK(3,1)u'_i & -HK(1,2) + HK(3,2)u'_i & -HK(1,3) - HK(3,3)u'_i \end{bmatrix}$$

$$[BB] = \begin{bmatrix} HK(2,1)u_i + HK(2,2)v_i - HK(3,1)v'_iu_i - HK(3,2)v'_iv_i \\ -HK(1,1)u_i - HK(1,2)v_i + HK(3,1)u'_iu_i + HK(3,2)u'_iv_i \end{bmatrix}$$

$$[CC] = \begin{bmatrix} u_c \\ v_c \\ f_b \end{bmatrix}$$

Then, [CC] is obtained from [CC]=[AA]$^{-1}$[BB] in order to thereby acquire the matrix [C] that is calibrated (S280).

More specifically, the components of [CC] are acquired from [CC]=[AA]$^{-1}$[BB] that is transformed from the equation [AA][CC]=[BB] to finally obtain the first conversion matrix [C] that is calibrated.

Next, the operation S300 of acquiring the posture definition matrix by using the first and second conversion matrices, which have been calibrated, will be described in more detail with reference to the drawings.

Figure 7:
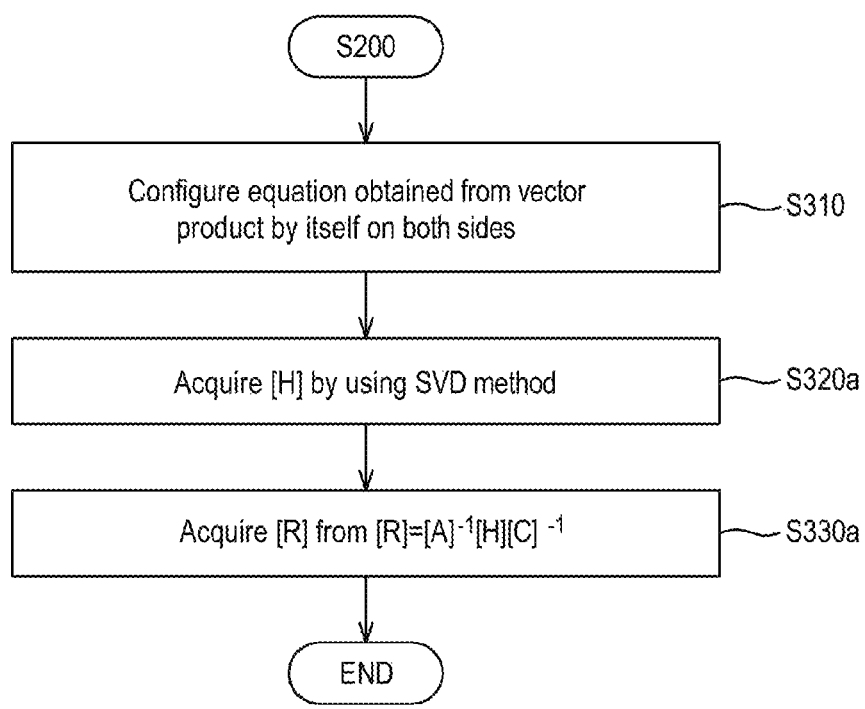
FIG. 7 is a flowchart illustrating an example of a process of acquiring a posture definition matrix in problem-solving process of FIG. 2.

FIG. 7 is a flowchart illustrating an example of a process for acquiring a posture definition matrix in problem-solving process of FIG. 2.

Referring to FIG. 7, as an example for obtaining the posture definition matrix [R], first, an equation, which is obtained from the vector product by itself with respect to both sides thereof, is configured (S310).

More specifically, since the vector product of Equation 1 by itself on both sides thereof results in zero, Equation 14 may be acquired by configuring the same as an equation.

$$\begin{bmatrix}u'_i\\v'_i\\1\end{bmatrix} \times \begin{bmatrix}u'_i\\v'_i\\1\end{bmatrix} = \begin{bmatrix}0 & -1 & v'_i\\1 & 0 & -u'_i\\-v'_i & u'_i & 0\end{bmatrix}[A][R][C]\begin{bmatrix}u_i\\v_i\\1\end{bmatrix} = 0 \quad\text{(Equation 14)}$$

Next, the matrix [H] is acquired by using such a method as singular value decomposition (SVD) (S320a).

More specifically, [H]=[A][R][C] of Equation 3 is applied to Equation 14 to then make an equation with respect to the components (H1, H2, . . . , H9) of the matrix [H] in order to thereby obtain Equation 15.

(Equation 15)

$$\begin{bmatrix} 0 & 0 & 0 & u_1 & v_1 & -1 & u_1v'_1 & v_1v'_1 & v'_1 \\ u_1 & v_1 & 1 & 0 & 0 & 0 & u_1u'_1 & v_1u'_1 & u'_1 \\ \vdots & \vdots & \vdots & \vdots & \vdots & \vdots & \vdots & \vdots & \vdots \\ 0 & 0 & 0 & u_n & v_n & -1 & u_nv'_n & v_nv'_n & v'_n \\ u_n & v_n & 1 & 0 & 0 & 0 & u_nu'_n & v_nu'_n & u'_n \end{bmatrix}\begin{bmatrix}H_1\\H_2\\H_3\\H_4\\H_5\\H_6\\H_7\\H_8\\H_9\end{bmatrix} = 0$$

Using a method such as singular value decomposition (SVD), 2n equations of Equation 15 are acquired.

Next, [R] is obtained from [R]=[A]$^{-1}$[H][C]$^{-1}$ (S330a).

More specifically, [R] is obtained from [R]=[A]$^{-1}$[H][C]$^{-1}$ that is transformed from [H]=[A][R][C] of Equation 3.

The posture definition matrix may be obtained by other methods.

Figure 8:
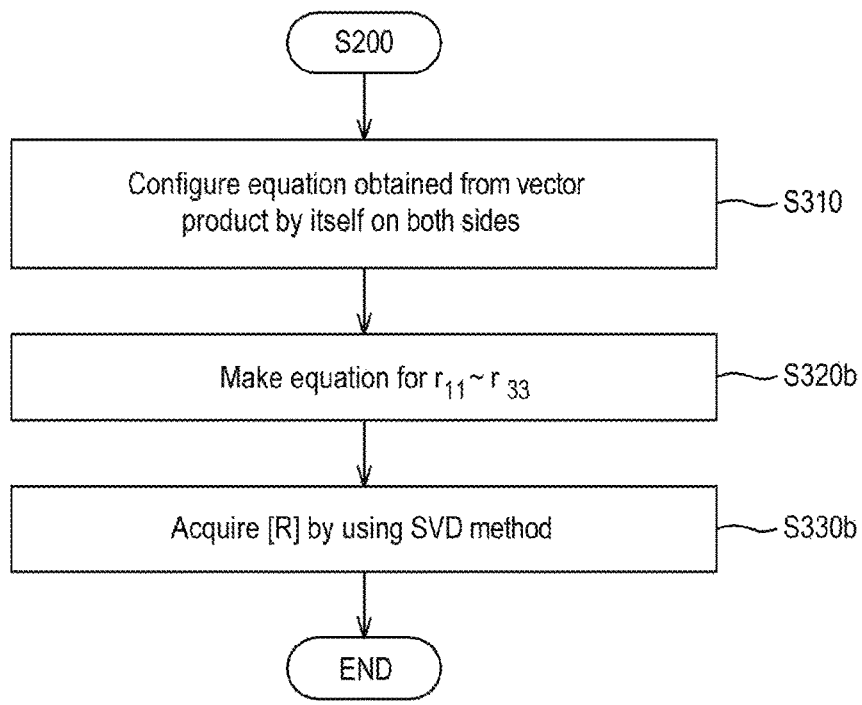
FIG. 8 is a flowchart illustrating another example of a process of acquiring a posture definition matrix in problem-solving process of FIG. 2.

FIG. 8 is a flowchart illustrating another example of a process for acquiring a posture definition matrix in problem-solving process of FIG. 2.

Referring to FIG. 8, as another example for obtaining the posture definition matrix [R], first, an equation, which is obtained from the vector product by itself with respect to both sides thereof (S310), is configured. This operation is the same as that of FIG. 7, so that duplicate description thereof will be omitted.

Subsequently, the equation is rewritten as an equation for $r_{11}$~$r_{33}$ (S320b).

More specifically, the equation with respect to each component $r_{11}$, $r_{12}$, $r_{13}$, $r_{21}$, $r_{22}$, $r_{23}$, $r_{31}$, $r_{32}$, or $r_{33}$ of the posture definition matrix [R] is made from Equation 14 in order to thereby acquire Equation 16.

(Equation 16)

$$\begin{bmatrix} \frac{f_c}{pw}u_1 & \frac{f_c}{pw}v_1 & \frac{f_c}{pw}f_b & 0 & 0 & 0 & (u'_1-u'_c)u_1 & (u'_1-u'_c)v_1 & (u'_1-u'_c)f_b \\ 0 & 0 & 0 & \frac{f_c}{ph}u_1 & \frac{f_c}{ph}v_1 & \frac{f_c}{ph}f_b & (v'_1-v'_c)u_1 & (v'_1-v'_c)v_1 & (v'_1-v'_c)f_b \\ & & & & \vdots & & & & \\ \frac{f_c}{pw}u_n & \frac{f_c}{pw}v_n & \frac{f_c}{pw}f_b & 0 & 0 & 0 & (u'_n-u'_c)u_n & (u'_n-u'_c)v_n & (u'_n-u'_c)f_b \\ 0 & 0 & 0 & \frac{f_c}{ph}u_n & \frac{f_c}{ph}v_n & \frac{f_c}{ph}f_b & (v'_n-v'_c)u_n & (v'_n-v'_c)v_n & (v'_n-v'_c)f_b \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

Next, the matrix [R] is obtained by using a method such as singular value decomposition (SVD) (S330b).

More specifically, 2n equations of Equation 16 are acquired by using a method such as singular value decomposition (SVD).

As described above, [R] is finally obtained.

The posture of the marker part 110 may be calculated by applying the system modeling process and the method for acquiring the posture definition matrix [R] described above to the optical tracking system 100 shown in FIG. 1.

Hereinafter, the method of calculating the posture of the marker part 110 by the processing part 130 will be described in more detail with reference to the drawings.

Figure 9:
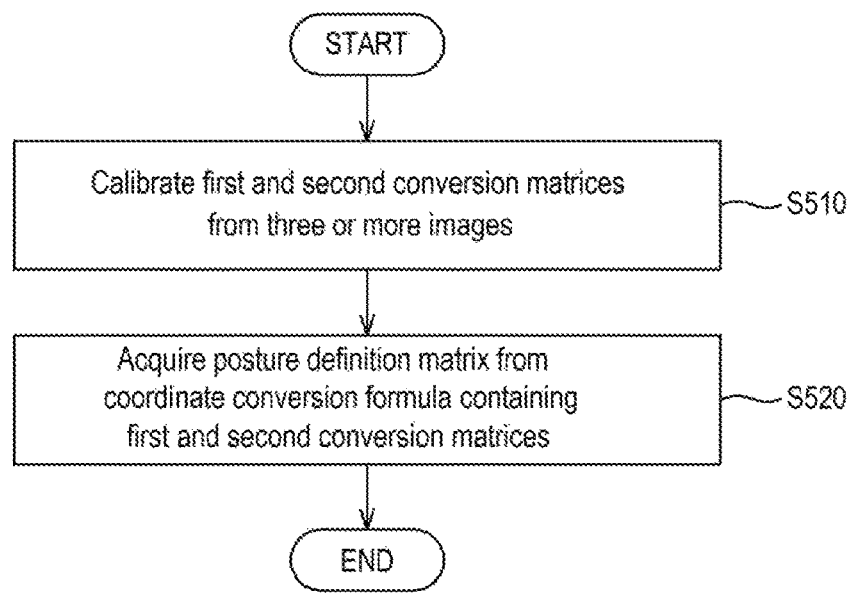
FIG. 9 is a flowchart illustrating a method of calculating the posture of a marker part of an optical tracking system, according to an embodiment of the present invention.

FIG. 9 is a flowchart illustrating a method of calculating the posture of the marker part of the optical tracking system, according to an embodiment of the present invention.

Referring to FIG. 9, first, the processing part 130 calibrates the first and second conversion matrices from three or more images (S510).

The calibration may be substantially the same as operation S200 described in FIG. 2 and operations S210 to S280 described in detail in FIGS. 5 and 6. The processing part 130 may calibrate the first and second conversion matrices by using only the final equation for the calibration as in operations S230 and S280 among the operations above.

Next, the posture definition matrix is acquired from the coordinate conversion formula that contains the first and second conversion matrices (S520).

The acquisition of the posture definition matrix may be substantially the same as operation S300 described in FIG. 2, operations S310 to S330a, and operations S310 to S330b described in detail in FIGS. 7 and 8. The processing part 130 may acquire the posture definition matrix by using only the final equation for the acquisition of the posture definition matrix as in operation S320a and S320b among the operations above.

Accordingly, the processing part 130 may acquire the first conversion matrix for converting the first coordinate to the second coordinate and the second conversion matrix for converting the third coordinate to the fourth coordinate through the calibration in advance, and may acquire the posture definition matrix for defining the posture of the marker part 110 from the coordinate conversion formula.

Once the posture definition matrix is acquired, the posture of the marker part 110 may be recognized. For example, the roll, pitch, and yaw of the marker part 110 may be recognized from the posture definition matrix.

According to the optical tracking system described above, the marker part can be miniaturized while including a pattern of particular information to enable the tracking, and the posture of the marker part can be determined by modeling the optical system of the marker part and the image forming part with the coordinate conversion formula. Therefore, it is possible to accurately track the marker part by a simpler and easier method.

Figure 10:
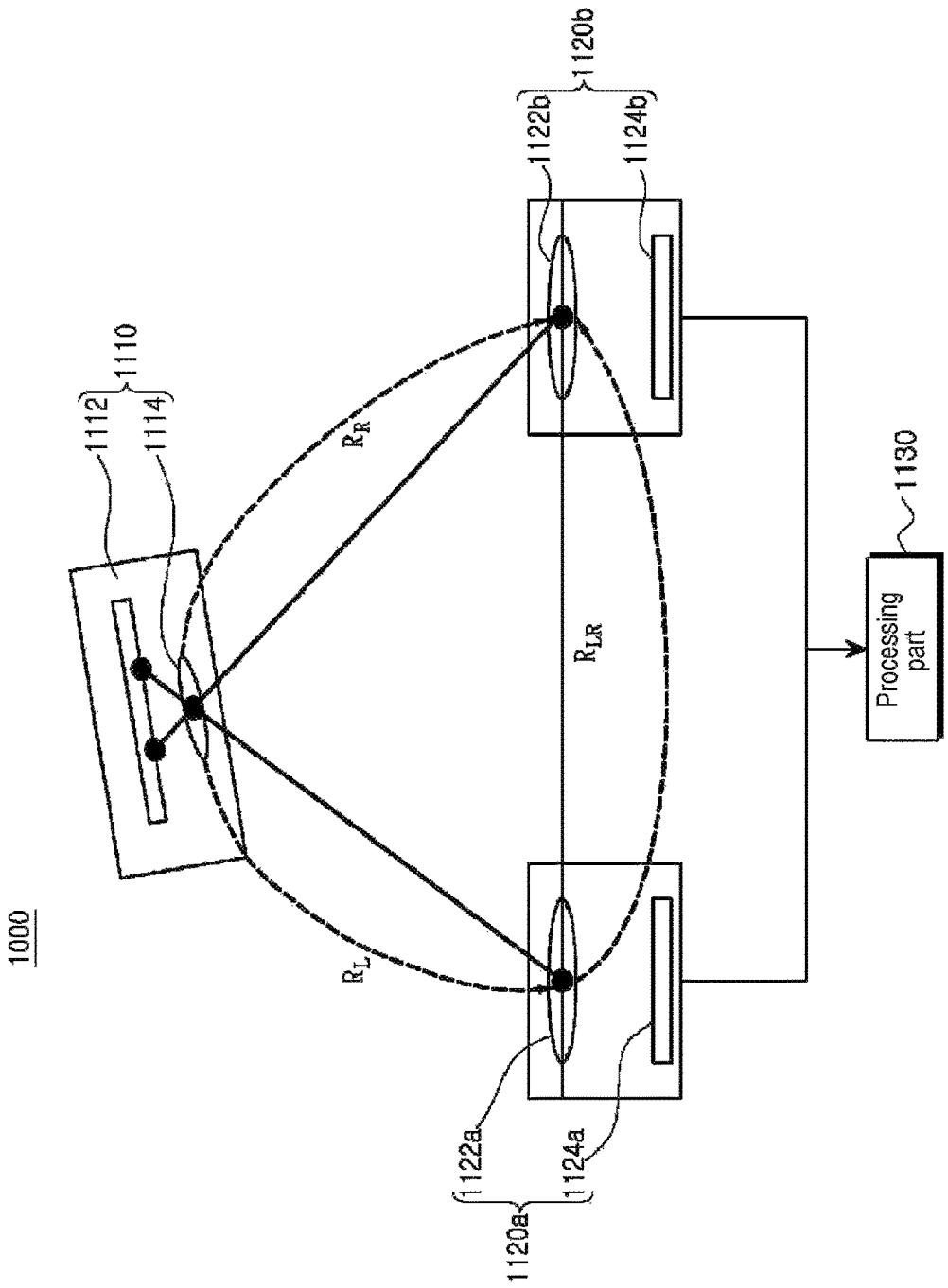
FIG. 10 is a conceptual diagram illustrating an optical tracking system, according to another embodiment of the present invention.

FIG. 10 is a conceptual diagram illustrating an optical tracking system, according to another embodiment of the present invention.

Referring to FIG. 10, the optical tracking system 1000, according to another embodiment of the present invention, includes a marker part 1110, a first image forming part 1120a, a second image forming part 1120b, and a processing part 1130.

The optical tracking system 1000 illustrated in FIG. 10 is substantially identical to the optical tracking system 100 illustrated in FIG. 1, except that a stereo structure including two image forming parts is applied and the processing part 1130 determines the posture by using two image forming parts, so the duplicate description thereof will be omitted.

The marker part 1110 includes a pattern 1112 and a first lens 1114, and is substantially the same as the marker part 110 illustrated in FIG. 1.

The first image forming part 1120a includes: a second lens that has a second focal length; and a first image forming unit that is spaced apart from the second lens and on which the first image of the pattern is formed by the first lens and the second lens.

The second image forming part 1120b includes: a third lens that has a third focal length; and a second image forming unit that is spaced apart from the third lens and on which the second image of the pattern is formed by the first lens and the third lens.

Each of the first image forming part 1120a and the second image forming part 1120b is substantially the same as the image forming part 120 shown in FIG. 1.

The processing part 1130 determines the posture of the marker part 1110 from: the first coordinate conversion formula between the coordinate on the pattern surface of the pattern 1112 and the first pixel coordinate on the first image of the pattern 1112; and the second coordinate conversion formula between the coordinate on the pattern surface of the pattern 1112 and the second pixel coordinate on the second image of the pattern 1112. At this time, the second coordinate conversion formula includes a rotation conversion between the first pixel coordinate and the second pixel coordinate on the second image. The processing part 1130 tracks the marker part 1110 by using the determined posture of the marker part 1110.

Hereinafter, a system modeling process that is the base of functions of the processing part 1130 and a process of determining the posture of the marker part 1110 according thereto will be described in more detail with reference to the drawings.

Figure 11:
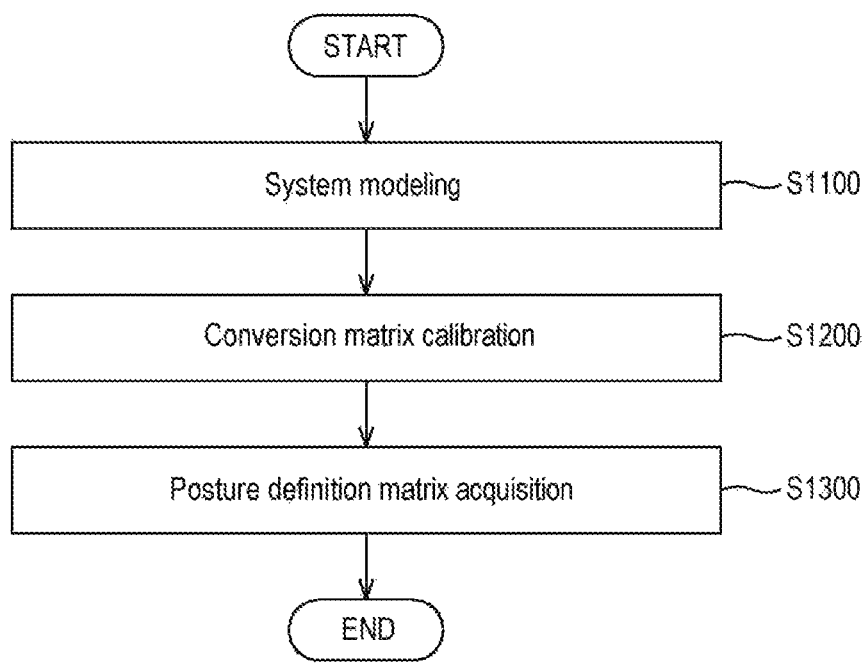
FIG. 11 is a flowchart schematically showing a problem-solving process that is necessary for a processing part of the optical tracking system of FIG. 10 to determine the posture of the marker part.

FIG. 11 is a flowchart schematically showing a problem-solving process that is necessary for the processing part of the optical tracking system of FIG. 10 to determine the posture of the marker part.

Referring to FIG. 11, first, the system modeling is conducted with respect to the optical tracking system 1000 that has the configuration as described above (S1100).

In the optical tracking system 1000 as shown in FIG. 10, since the coordinate conversion between the coordinate on the pattern surface of the pattern 1112 and the pixel coordinate on the image of the pattern 1112 is made by the optical system of the optical tracking system 1000, the coordinate conversion formula may be configured by modeling the coordinate conversion according to the optical system of the optical tracking system 1000. At this time, the modeling of the coordinate conversion according to the optical system of the optical tracking system 1000 may be made by each optical system of the marker part 1110 and the first and second image forming parts 1120a and 1120b and by a relationship therebetween.

Then, among the coordinate conversion formula that is acquired as a result of the system modeling, the first, second, third, and fourth conversion matrixes, which will be described later, are calibrated (S1200).

When defining: the coordinate on the pattern surface of the pattern 1112 shown in FIG. 10 as the first coordinate; the three-dimensional local coordinate of the first coordinate for the first lens 1114 as the second coordinate; the three-dimensional local coordinate of the second coordinate for the second lens 1122a as the third coordinate; and the pixel coordinate on the first image of the pattern 1112 of the first image forming part 1120a as the fourth coordinate, respectively, the first conversion matrix converts the first coordinate to the second coordinate, and the second conversion matrix converts the third coordinate to the fourth coordinate.

In addition, when defining: the coordinate on the pattern surface of the pattern 1112 shown in FIG. 10 as the fifth coordinate; the three-dimensional local coordinate of the fifth coordinate for the first lens 1114 as the sixth coordinate; the three-dimensional local coordinate of the sixth coordinate for the third lens 1122b as the seventh coordinate; and the pixel coordinate on the second image of the pattern 1112 of the second image forming part 1120b as the eighth coordinate, respectively, the third conversion matrix converts the fifth coordinate to the sixth coordinate, and the fourth conversion matrix converts the seventh coordinate to the eighth coordinate.

Although the coordinate conversion formula that is acquired as a result of the system modeling is determined as an equation of various parameters of the optical systems of the marker part 1110 and the image forming part 1120 shown in FIG. 10, the parameters may not be accurately acquired or values thereof may vary with the mechanical arrangement state. Therefore, the more accurate system modeling can be made by calibrating the first conversion matrix and the second conversion matrix.

Next, a posture definition matrix is acquired by using the calibration result (S1300).

The posture definition matrix provides information about the posture of the marker part 1110 so that the roll, pitch, and yaw of the marker part 1110 may be recognized from the posture definition matrix.

Hereinafter, each operation of FIG. 11 will be described in more detail.

First, the method and the result, which have been described in FIG. 3, are equally applied to the system modeling (S1100). Therefore, Equation 1 may be independently applied to the first image forming part 1120a and/or the second image forming part 1120b. According to this, Equation 17 below may be acquired as a result of the system modeling. For the convenience, in Equation 17, L and l are applied to the variables for the first image forming part 1120a, and R and r are applied to the variables for the second image forming part 1120b.

$$s\begin{bmatrix} lu' \\ lv' \\ 1 \end{bmatrix} = [A_l][R_L][C]\begin{bmatrix} lu \\ lv \\ 1 \end{bmatrix}$$ (Equation 17)

$$s\begin{bmatrix} ru' \\ rv' \\ 1 \end{bmatrix} = [A_r][R_R][C]\begin{bmatrix} ru \\ rv \\ 1 \end{bmatrix} = [A_r][R_{LR}][R_L][C]\begin{bmatrix} ru \\ rv \\ 1 \end{bmatrix}$$

Here, (lu,lv) denotes the first coordinate. (lu',lv') denotes the fourth coordinate. [C] denotes the first conversion matrix. [Al] denotes the second conversion matrix. [RL] denotes the first posture definition matrix. (ru,rv) denotes the fifth coordinate. (ru',rv') denotes the eighth coordinate. [C] denotes the third conversion matrix that is the same as the first conversion matrix. [Ar] denotes the fourth conversion matrix. In addition, [RR] denotes the second posture definition matrix. In addition, referring to FIG. 10, the matrix [RR] may be expressed as a matrix [RLR][RL]. Here, [RLR] indicates the matrix that converts the three-dimensional local coordinate for the first image forming part 1120a to the three-dimensional local coordinate for the second image forming part 1120b, and may be a matrix for defining the posture of the first image forming part 1120a with respect to the second image forming part 1120b.

Next, the operation S1200 of calibrating the first, second, third, and fourth conversion matrixes in the coordinate conversion formula that is acquired as a result of the system modeling will be described in more detail with reference to the drawings.

Figure 12:
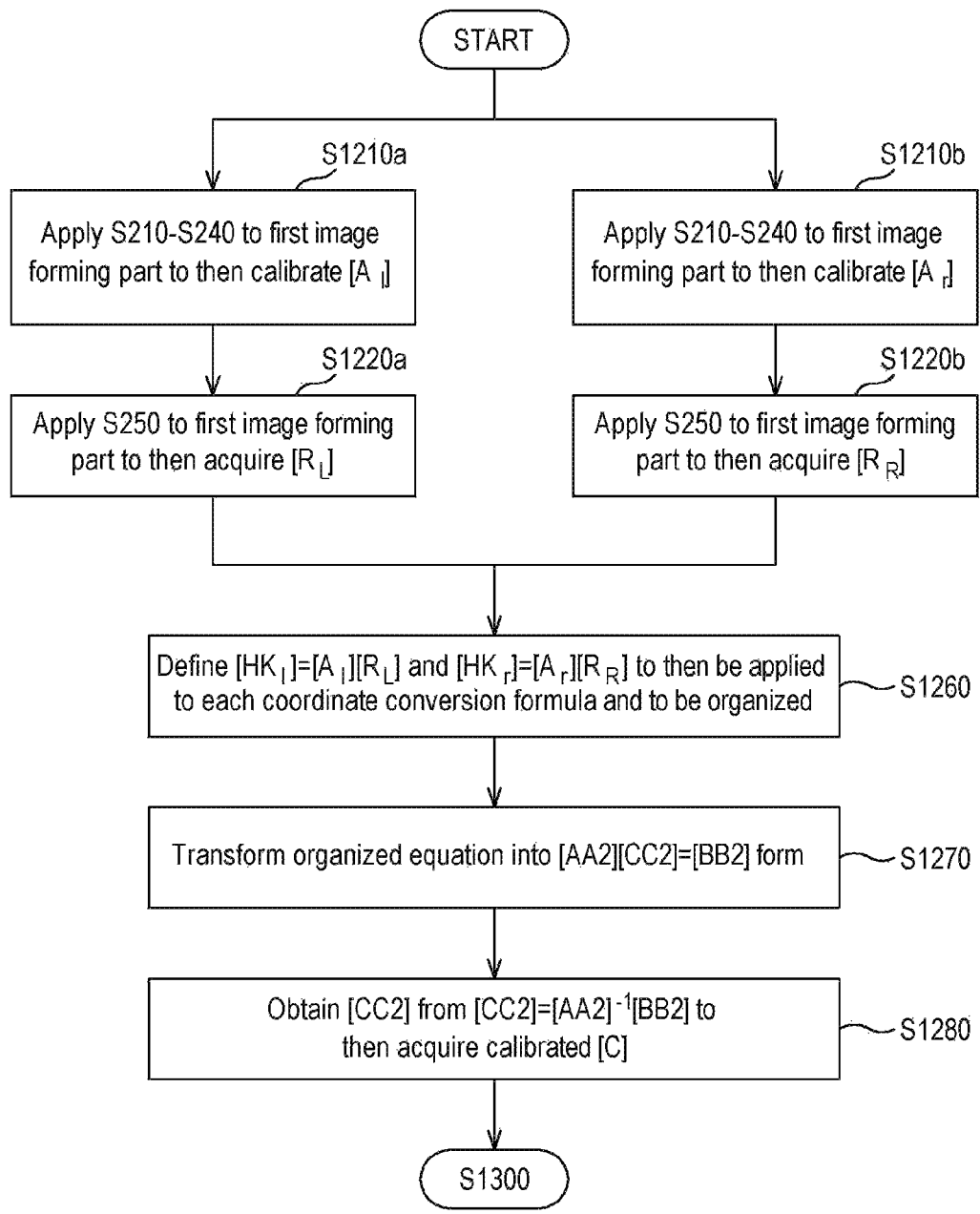
FIG. 12 is a flowchart illustrating a process of calibrating conversion matrixes in the problem-solving process of FIG. 11.

FIG. 12 is a flowchart illustrating an operation of calibrating conversion matrixes in the problem-solving process of FIG. 11.

The operation of calibrating conversion matrixes is basically the same as the operation that is described in FIGS. 5 and 6 above.

Referring to FIG. 12, first, [Al] is calibrated by applying operations S210 to S240 to the first image forming part 1120a (S1210a). Next, [RL] is acquired by applying operation S250 to the first image forming part 1120a (S1220a).

In addition, in parallel with this, [Ar] is calibrated by applying operations S210 to S240 to the second image forming part 1120b (S1210b). Next, [RR] is acquired by applying operation S250 to the second image forming part 1120b (S1220b).

As described above, [C] is calibrated in a similar manner as described in FIGS. 5 and 6 by using [Al], [RL], [Ar], and [RR] that are independently acquired according to the method described in FIGS. 5 and 6.

More specifically, first, the matrix [HKl] is defined as [HKl]=[Al][RL] and the [HKr] is defined as [HKr]=[Ar][RR] to then be applied to each coordinate conversion formula (S1260). This operation corresponds to operation S260 that is described in FIG. 6, and thus, Equation 18 is acquired, which is comprised of the components of the matrixes [HKl], the matrix [HKr], and the matrix [C].

$$s_l \begin{bmatrix} lu'_i \\ lv'_i \\ 1 \end{bmatrix} = [A_l][R_L][C] \begin{bmatrix} lu_i \\ lv_i \\ 1 \end{bmatrix} =$$

(Equation 18)

$$[HK_l][C] \begin{bmatrix} lu_i \\ lv_i \\ 1 \end{bmatrix} = [HK_l] \begin{bmatrix} 1 & 0 & -u_c \\ 0 & 1 & -v_c \\ 0 & 0 & f_b \end{bmatrix} \begin{bmatrix} lu_i \\ lv_i \\ 1 \end{bmatrix} = 0$$

$$s_r \begin{bmatrix} ru'_i \\ rv'_i \\ 1 \end{bmatrix} = [A_r][R_R][C] \begin{bmatrix} ru_i \\ rv_i \\ 1 \end{bmatrix} = [HK_r][C] \begin{bmatrix} ru_i \\ rv_i \\ 1 \end{bmatrix} =$$

$$[HK_r] \begin{bmatrix} 1 & 0 & -u_c \\ 0 & 1 & -v_c \\ 0 & 0 & f_b \end{bmatrix} \begin{bmatrix} ru_i \\ rv_i \\ 1 \end{bmatrix} = 0$$

Next, the obtained equation is transformed into a form of [AA2][CC2]=[BB2] (S1270). This operation corresponds to operation S270 that is described in FIG. 6, and at this time, the matrix [AA2], the matrix [BB2], and the matrix [CC2] may be defined as Equation 19.

(Equation 19)

$$[AA2] = \begin{bmatrix} HK_l(2,1) - HK_l(3,1)lv'_i & HK_l(2,2) - HK_l(3,2)lv'_i & -HK_l(2,3) + HK_l(3,3)lv'_i \\ -HK_l(1,1) + HK_l(3,1)lu'_i & -HK_l(1,2) + HK_l(3,2)lu'_i & HK_l(1,3) - HK_l(3,3)lu'_i \\ HK_r(2,1) - HK_r(3,1)rv'_i & HK_r(2,2) - HK_r(3,2)rv'_i & -HK_r(2,3) + HK_r(3,3)rv'_i \\ -HK_r(1,1) + HK_r(3,1)ru'_i & -HK_r(1,2) + HK_r(3,2)ru'_i & HK_r(1,3) - HK_r(3,3)ru'_i \end{bmatrix}$$

$$[BB2] = \begin{bmatrix} HK_l(2,1)lu_i + HK_l(2,2)lv_i - HK_l(3,1)lv'_i lu_i - HK_l(3,2)lv'_i lv_i \\ -HK_l(1,1)lu_i - HK_l(1,2)lv_i + HK_l(3,1)lu'_i lu_i + HK_l(3,2)lu'_i lv_i \\ HK_r(2,1)ru_i + HK_r(2,2)rv_i - HK_r(3,1)rv'_i ru_i - HK_r(3,2)rv'_i rv_i \\ -HK_r(1,1)ru_i - HK_r(1,2)rv_i + HK_r(3,1)ru'_i ru_i + HK_r(3,2)ru'_i rv_i \end{bmatrix}$$

$$[CC2] = \begin{bmatrix} u_c \\ v_c \\ f_b \end{bmatrix}$$

Next, [CC2] is obtained from [CC2]=[AA2]−1[BB2] in order to thereby acquire the calibrated [C] (S1280). This operation corresponds to operation S280 that is described in FIG. 6, and the components of [CC2] from [CC2]=[AA2]−1[BB2] that is transformed from [AA2][CC2]=[BB2] to then eventually acquire [C] corresponding to the first and third calibrated conversion matrixes.

Next, the operation S1300 of acquiring the posture definition matrix by using the first, second, third, and fourth calibrated conversion matrixes will be described in more detail with reference to the drawings.

Figure 13:
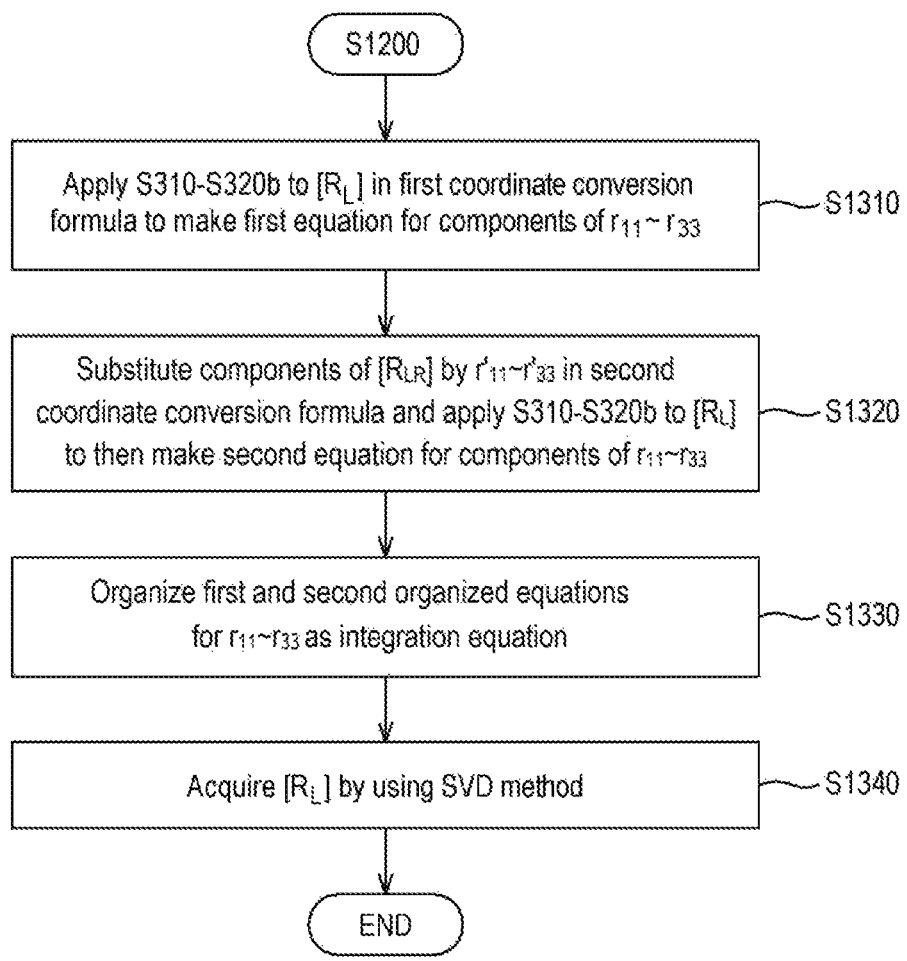
FIG. 13 is a flowchart illustrating an example of a process of acquiring a posture definition matrix in the problem-solving process of FIG. 11.

FIG. 13 is a flowchart illustrating an example of a process of acquiring a posture definition matrix in the problem-solving process of FIG. 11.

The operation of acquiring the posture definition matrix is basically the same as the operation described in FIG. 8 above, except that it uses more data as a stereo structure.

Referring to FIG. 13, first, operations S310 and S320b are applied to [RL] in the first coordinate conversion formula in order to thereby make the first equation for the components r11~r33 (S1310). This operation corresponds to operations S310 and S320b described in FIG. 8, and the first equation is shown in Equation 20.

(Equation 20)

$$[R_L] = \begin{bmatrix} r_{11} & r_{12} & r_{13} \\ r_{21} & r_{22} & r_{23} \\ r_{31} & r_{32} & r_{33} \end{bmatrix}$$

-continued $$\begin{bmatrix} \frac{f_c}{pw}u_1 & \frac{f_c}{pw}v_1 & \frac{f_c}{pw}f_b & 0 & 0 & 0 & (u'_1-u'_c)u_1 & (u'_1-u'_c)v_1 & (u'_1-u'_c)f_b \\ 0 & 0 & 0 & \frac{f_c}{ph}u_1 & \frac{f_c}{ph}v_1 & \frac{f_c}{ph}f_b & (v'_1-v'_c)u_1 & (v'_1-v'_c)v_1 & (v'_1-v'_c)f_b \\ & & & & \vdots & & & & \\ \frac{f_c}{pw}u_n & \frac{f_c}{pw}v_n & \frac{f_c}{pw}f_b & 0 & 0 & 0 & (u'_n-u'_c)u_n & (u'_n-u'_c)v_n & (u'_n-u'_c)f_b \\ 0 & 0 & 0 & \frac{f_c}{ph}u_n & \frac{f_c}{ph}v_n & \frac{f_c}{ph}f_b & (v'_n-v'_c)u_n & (v'_n-v'_c)v_n & (v'_n-v'_c)f_b \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

Subsequently, the components of $[R_{LR}]$ are substituted by $r'_{11} \sim r'_{33}$ in the second coordinate conversion formula, and operations S310 and S320b are applied to $[R_L]$ in order to make the second equation for $r_{11} \sim r_{33}$ (S1320). This operation is the application of operations S310 and S320b described in FIG. 8, and the second equation is shown in Equation 21 below.

$$[R_{LR}] = \begin{bmatrix} r'_{11} & r'_{12} & r'_{13} \\ r'_{21} & r'_{22} & r'_{23} \\ r'_{31} & r'_{32} & r'_{33} \end{bmatrix} \tag{Equation 21}$$

$$\begin{bmatrix} A1r'_{11}+B1r'_{31} & C1r'_{11}+D1r'_{31} & E1r'_{11}+F1r'_{31} & A1r'_{12}+B1r'_{32} & C1r'_{12}+D1r'_{302} & E1r'_{12}+F1r'_{32} & A1r'_{13}+B1r'_{33} & C1r'_{13}+D1r'_{33} & E1r'_{13}+F1r'_{33} \\ A2r'_{11}+B2r'_{31} & C12r'_{11}+D2r'_{31} & E2r'_{11}+F2r'_{31} & A2r'_{12}+B2r'_{32} & C2r'_{12}+D2r'_{302} & E2r'_{12}+F2r'_{32} & A2r'_{13}+B2r'_{33} & C2r'_{13}+D2r'_{33} & E2r'_{13}+F2r'_{33} \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

$$A1 = -\frac{f_c}{pw}ru_i,\ B1 = ru_i(ru'_c - ru'_i),\ C1 = -\frac{f_c}{pw}rv_i,$$

$$D1 = rv_i(ru'_c - ru'_i),\ E1 = -\frac{f_c}{pw}f_b,\ F1 = f_b(ru'_c - ru'_i)$$

$$A2 = -\frac{f_c}{ph}ru_i,\ B2 = ru_i(rv'_c - rv'_i),\ C2 = -\frac{f_c}{ph}rv_i,$$

$$D2 = rv_i(rv'_c - rv'_i),\ E2 = -\frac{f_c}{ph}f_b,\ F2 = f_b(rv'_c - rv'_i)$$

Next, the first and second equations obtained for $r_{11}$~$r_{33}$ are organized as an integration equation (S1330). Thus, Equation 22 is acquired.

Accordingly, the processing part 1130 may acquire: the first conversion matrix for converting the first coordinate to the second coordinate; the second conversion matrix for (Equation 22)

$$\begin{bmatrix} LW_1 \\ RW_1 \\ \vdots \\ LW_n \\ RW_n \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

$$LW_i = \begin{bmatrix} \frac{f_c}{pw}lu_i & \frac{f_c}{pw}lv_i & \frac{f_c}{pw}f_b & 0 & 0 & 0 & (lu'_i - lu'_c)u_i & (lu'_i - lu'_c)v_i & (lu'_i - lu'_c)f_b \\ 0 & 0 & 0 & \frac{f_c}{ph}lu_i & \frac{f_c}{ph}lv_i & \frac{f_c}{ph}f_b & (lv'_i - lv'_c)u_i & (lv'_i - lv'_c)v_i & (lv'_i - lv'_c)f_b \end{bmatrix}$$

$$RW_i = \begin{bmatrix} A1r'_{11} + B1r'_{31} & C1r'_{11} + D1r'_{31} & E1r'_{11} + F1r'_{31} & A1r'_{12} + B1r'_{32} & C1r'_{12} + D1r'_{302} & E1r'_{12} + F1r'_{32} & A1r'_{13} + B1r'_{33} & C1r'_{13} + D1r'_{33} & E1r'_{13} + F1r'_{33} \\ A2r'_{11} + B2r'_{31} & C12r'_{11} + D2r'_{31} & E2r'_{11} + F2r'_{31} & A2r'_{12} + B2r'_{32} & C2r'_{12} + D2r'_{302} & E2r'_{12} + F2r'_{32} & A2r'_{13} + B2r'_{33} & C2r'_{13} + D2r'_{33} & E2r'_{13} + F2r'_{33} \end{bmatrix}$$

Next, the matrix [RL] is acquired by using such a method as singular value decomposition (SVD) (S1340).

More specifically, since the matrixes [LWi] and [RWi] contain two equations, respectively, in Equation 22, a total of 4n equations are obtained for r11~r33. Thus, they are acquired by using such a method as singular value decomposition (SVD).

Since Equation 22, which contains 4n equations, contains more equations than the method described in FIGS. 1 to 9, a more accurate result for the matrix [RL] can be obtained. Thus, it is possible to make a more accurate posture measurement of the marker part 1110.

Now, the method of calculating the posture of the marker part 1110 by the processing part 1130 will be described in more detail with reference to the drawings.

Figure 14:
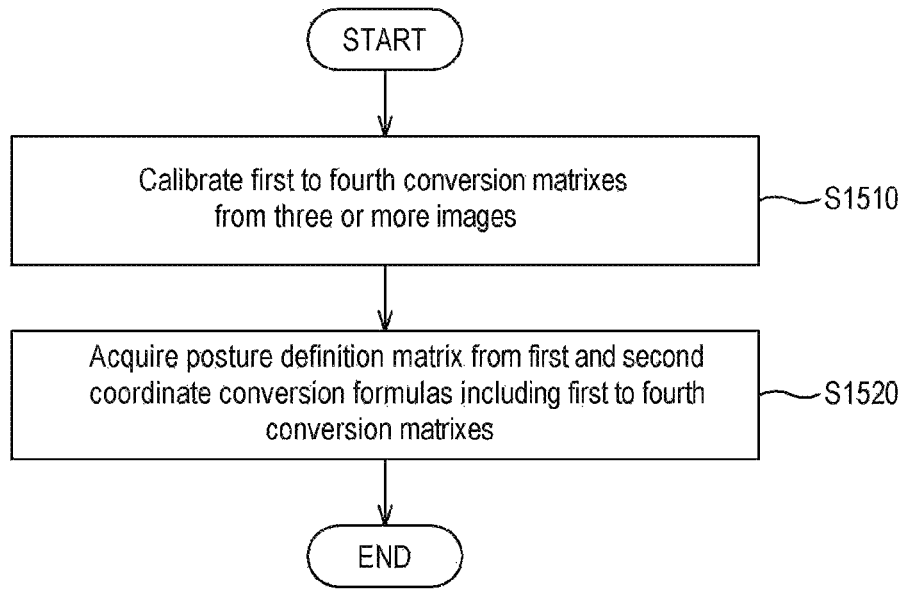
FIG. 14 is a flowchart illustrating a method of calculating the posture of a marker part of an optical tracking system, according to another embodiment of the present invention.

FIG. 14 is a flowchart illustrating a method of calculating the posture of the marker part of an optical tracking system, according to another embodiment of the present invention.

Referring to FIG. 14, first, the processing part 1130 calibrates the first, second, third, and fourth conversion matrixes from three or more images (S1510).

The calibration may be substantially the same as operation S1200 described in FIG. 11 and operations S1210a and S1210b to S1280 described in detail in FIG. 12. The processing part 1130 may calibrate the first and second conversion matrixes by using only the final equation for the calibration as in operations S1210a, S1220a, S1210b, S1220b, and S1280 among the operations above.

Next, the posture definition matrix is acquired from the first and second coordinate conversion formulas that contain the first, second, third, and the fourth conversion matrixes (S1520).

The acquisition of the posture definition matrix may be substantially the same as operation S1300 described in FIG. 11 and operations S1310 to S1340 described in detail in FIG. 13. The processing part 1130 may acquire the posture definition matrix by using only the final equation for the posture definition matrix as in operations S1330 and S1340 among the operations above.

converting the third coordinate to the fourth coordinate; the third conversion matrix for converting the fifth coordinate to the sixth coordinate; and the fourth conversion matrix for converting the seventh coordinate to the eighth coordinate through the calibration in advance, and may acquire the posture definition matrix for defining the posture of the marker part 1110 from the first and second coordinate conversion formulas.

Once the posture definition matrix is acquired, the posture of the marker part 1110 may be recognized. For example, the roll, pitch, and yaw of the marker part 1110 may be recognized from the posture definition matrix.

According to the optical tracking system as described above, in the optical tracking system for tracking a marker part, the marker part can be miniaturized while including a pattern of particular information to enable the tracking, and the posture of the marker part can be determined more accurately by modeling the optical systems of the marker part and the image forming part with the coordinate conversion formula while applying a stereo structure thereto. Therefore, it is possible to accurately track the marker part by a simpler and easier method.

Meanwhile, the optical tracking system 1000 as described above may determine the location of the marker part 1110, as well as the posture of the marker part 1110.

Hereinafter, a system modeling process for determining the location of the marker part 1110 and a process of determining the location of the marker part 1110 according to the same will be described in more detail with reference to the drawings.

Figure 15:
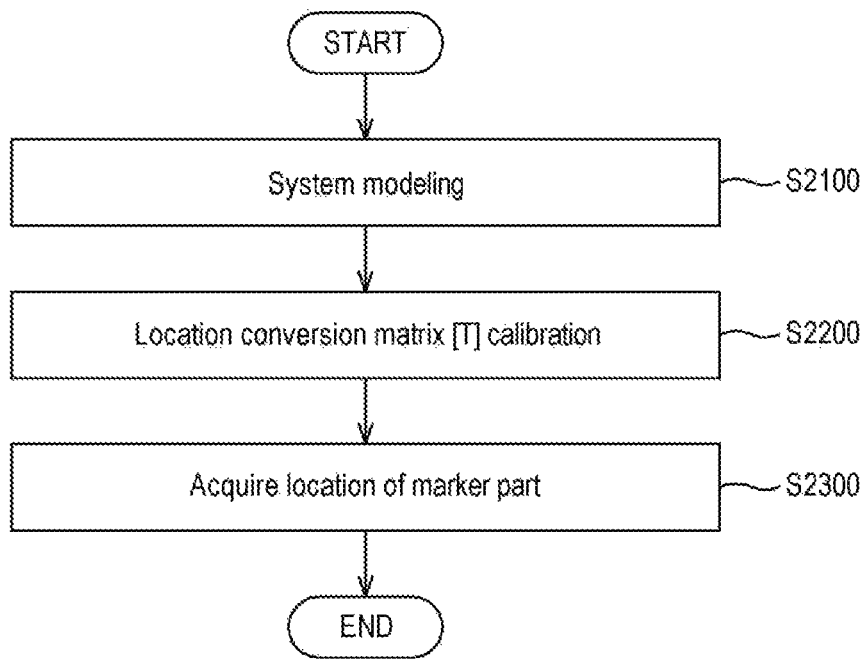
FIG. 15 is a flowchart schematically showing a problem-solving process that is necessary for a processing part of the optical tracking system of FIG. 10 to determine the location of the marker part.

FIG. 15 is a flowchart schematically showing a problem-solving process that is necessary for the processing part of the optical tracking system of FIG. 10 to determine the location of the marker part.

Referring to FIG. 15, first, the system modeling of the optical tracking system 1000 that has the configuration described above is performed (S2100).

Unlike the coordinate conversion formula described above, the system modeling is performed so as to include the second coordinate (equal to the sixth coordinate) corresponding to the coordinate of the center of the first lens 1114 (see FIG. 10) of the marker part 1110 (see FIG. 10) in order to acquire the location of the marker part 1110.

Subsequently, a location conversion matrix [T] is calibrated from the result of the system modeling (S2200).

The location conversion matrix [T] refers to a matrix that converts the location of the first image forming part 1120*a* (see FIG. 10) to the location of the second image forming part 1120*b* (see FIG. 10) according to the separation of the first image forming part 1120*a* and the second image forming part 1120*b*.

Next, the location of the marker part 1110 is acquired (S2300).

More specifically, the three-dimensional coordinate of the center of the first lens 1114 of the marker part 1110 are acquired.

Figure 16:
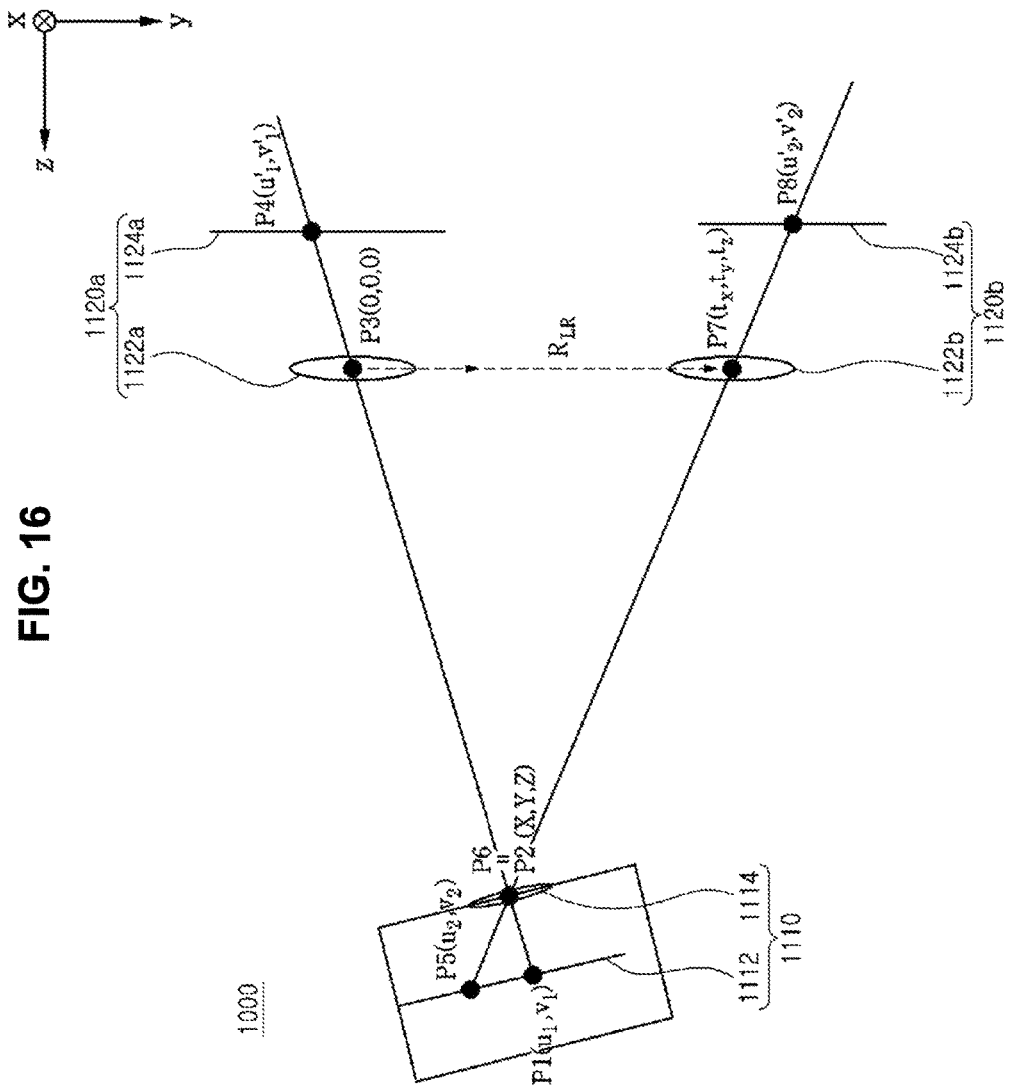
FIG. 16 is a conceptual diagram for explaining the process of system modeling in the problem-solving process of FIG. 15.

FIG. 16 is a conceptual diagram for explaining the process of system modeling in the problem-solving process of FIG. 15.

Referring to FIG. 16, the third coordinate conversion formula between the second coordinate (P2) corresponding to the coordinate of the center of the first lens 1114 of the marker part 1110 and the fourth coordinate (P4) corresponding to the first pixel coordinate on the first image of the pattern 1112 of the first image forming part 1120*a* is configured. The third coordinate conversion formula may be expressed as a matrix equation as shown in Equation 23.

$$s \begin{bmatrix} u'_1 \\ v'_1 \\ 1 \end{bmatrix} = A_L[I \mid 0] \begin{bmatrix} X \\ Y \\ Z \\ 1 \end{bmatrix} \quad \text{(Equation 23)}$$

Here, (u',v') denotes the fourth coordinate (P4). (X,Y,Z) denotes the second coordinate (P2). [AL] denotes the second conversion matrix. [I] denotes an identity matrix in a 3×3 form. In addition, [0] denotes a zero-matrix in a 3×1 form. As shown in FIG. 16, since the second lens 1122*a* of the first image forming part 1120*a* is the origin, based on this, a rotation conversion portion of the fourth coordinate (P4) appears as an identity matrix, and a location conversion portion thereof appears as a zero-matrix. Thus, it may be expressed as [I|0].

Next, the fourth coordinate conversion formula between the sixth coordinate (P6) {equal to the second coordinate (P2)} corresponding to the coordinate of the center of the first lens 1114 of the marker part 1110 and the eighth coordinate (P8) corresponding to the second pixel coordinate on the second image of the pattern 1112 of the second image forming part 1120*b* is configured. The fourth coordinate conversion formula is configured so as to include the location conversion matrix [T] between the first image forming part 1120*a* and the second image forming part 1120*b*. According to this, the fourth coordinate conversion formula may be expressed as a matrix equation as shown in Equation 24.

$$s \begin{bmatrix} u'_2 \\ v'_2 \\ 1 \end{bmatrix} = A_R[R_{LR} \mid T] \begin{bmatrix} X \\ Y \\ Z \\ 1 \end{bmatrix} \quad \text{(Equation 24)}$$

Here, (u'2,v'2) denotes the eighth coordinate (P8). (X,Y,Z) denotes the sixth coordinate (P6) {equal to the second coordinate (P2)}. [AR] denotes the fourth conversion matrix. [RLR] denotes a matrix that has a 3×3 form and defines the posture of the first image forming part 1120*a* with respect to the second image forming part 1120*b* as described in FIG. 11 or the like. [T] denotes a location conversion matrix that has a 3×1 form and converts the location of the first image forming part 1120*a* to the location of the second image forming part 1120*b*. As shown in FIG. 16, since the first lens 1122*a* of the first image forming part 1120*a* is the origin, based on this, a rotation conversion portion of the eighth coordinate (P8) of the second image forming part 1120*b* appears as the matrix [RLR], and a location conversion portion thereof appears as [T]. Thus, it may be expressed as [RLR|T].

The factors shown in the system modeling are obtained in FIGS. 11 to 14 above, except for the location conversion matrix [T]. Therefore, when the location conversion matrix [T] is obtained, the second coordinate (P2) {equal to the sixth coordinate (P6)} (i.e., the location of the marker part 1110) may be acquired.

Next, the operation S2200 of calibrating the location conversion matrix [T] among the third and fourth coordinate conversion formulas that are acquired as a result of the system modeling will be described in more detail with reference to the drawings.

Figure 17:
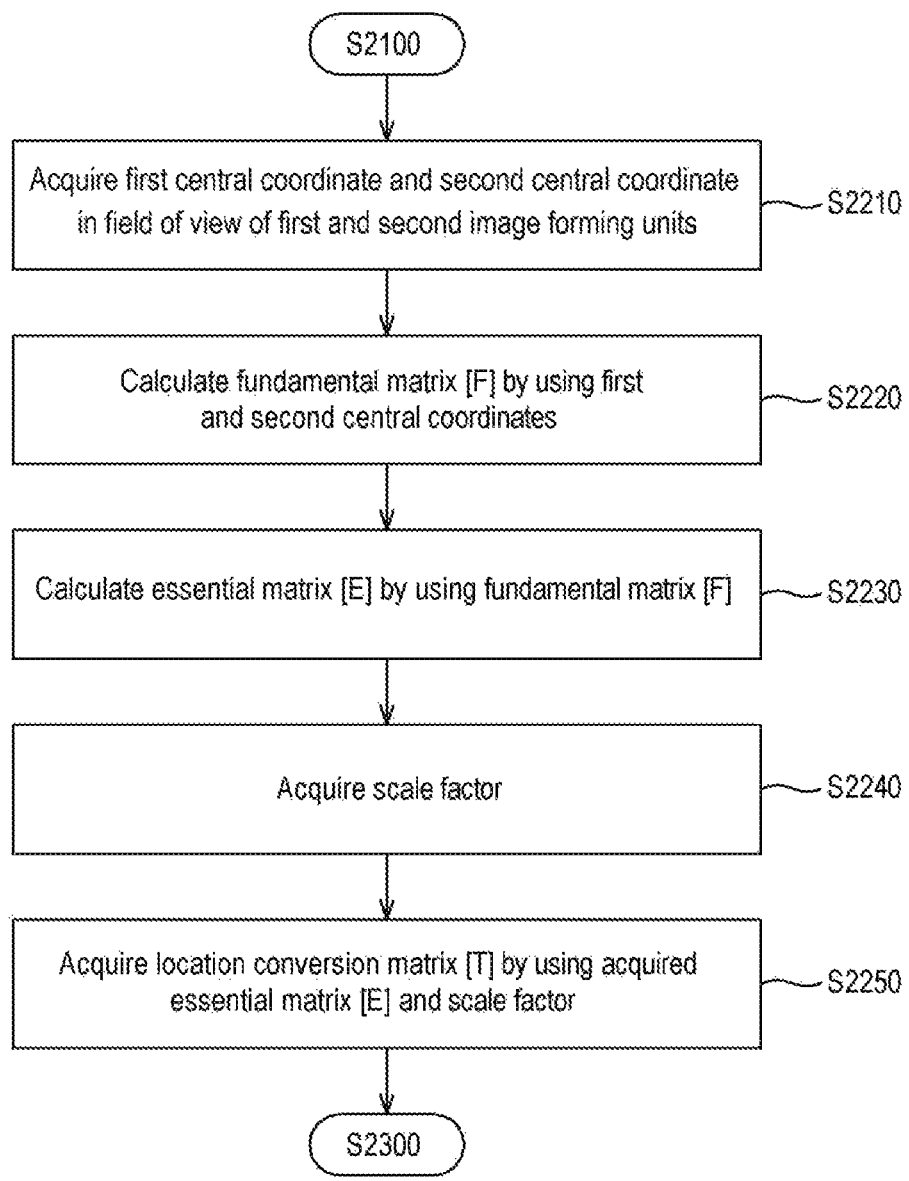
FIG. 17 is a flowchart illustrating a process of calibrating the location conversion matrix in the problem-solving process of FIG. 15.

FIG. 17 is a flowchart illustrating a process of calibrating the location conversion matrix in the problem-solving process of FIG. 15.

Referring to FIG. 17, first, the first central coordinate the second central coordinate are acquired, which are photographed in the first and second image forming units 1124*a* and 1124*b*, respectively (S2210).

Here, each of the first and second central coordinates refers to the center of a field of view that appears when photographing the pattern 1112 in the first and second image forming units 1124*a* and 1124*b*, respectively, and a plurality of central coordinates may be acquired.

Next, a fundamental matrix [F] is calculated by using the first and second acquired central coordinates (S2220).

The fundamental matrix may be expressed as Equation 25.

$$[u'_{2j} \ v'_{2j} \ 1]F \begin{bmatrix} u'_{1j} \\ v'_{1j} \\ 1 \end{bmatrix} = [u'_{2j} \ v'_{2j} \ 1] \begin{bmatrix} F_{11} & F_{12} & F_{13} \\ F_{21} & F_{22} & F_{23} \\ F_{31} & F_{32} & F_{33} \end{bmatrix} \begin{bmatrix} u'_{1j} \\ v'_{1j} \\ 1 \end{bmatrix} = 0 \quad \text{(Equation 25)}$$

In Equation 25, the subscript j represents the order of data that is obtained when acquiring a plurality of central coordinates.

Equation 26 may be obtained by organizing Equation 25 with respect to the components of the fundamental matrix [F]. With regard to Equation 26, fundamental matrix [F], for example, may be acquired by applying such a method as singular value decomposition (SVD) to eight or more points.

$$\begin{bmatrix} u'_{1j}u'_{2j} & v'_{1j}u'_{2j} & u'_{2j} & u'_{1j}v'_{2j} & v'_{1j}v'_{2j} & v'_{2j} & u'_{1j} & v'_{1j} & 1 \\ & & & \vdots & & & & & \end{bmatrix}$$ (Equation 26)

$$\begin{bmatrix} F_{11} \\ F_{12} \\ F_{13} \\ F_{21} \\ F_{22} \\ F_{23} \\ F_{31} \\ F_{32} \\ F_{33} \end{bmatrix} = 0$$

Subsequently, an essential matrix [E] is calculated by using the obtained fundamental matrix [F] (S2230).

The essential matrix [E] is expressed as shown in Equation 27.

$$E = A_R^T F A_L$$ (Equation 27)

Since the essential matrix [E] that is calculated from Equation 27 is expressed as the product of a location conversion and a rotation conversion, when it is organized as shown in Equation 28, the matrix [t]X corresponding to the location conversion component may be obtained.

$$E = [t]_\times R_{LR}$$ (Equation 28)

$$[t]_\times = \begin{bmatrix} 0 & -t_z & t_y \\ t_z & 0 & -t_x \\ -t_y & t_x & 0 \end{bmatrix}$$

$$[t]_\times = E \cdot R_{LR}^{-1}$$

Although the matrix [t]X may be the same as the location conversion matrix, the location conversion matrix may be calculated by multiplying a scale factor, if necessary.

Accordingly, next, the scale factor is acquired (S2240).

The scale factor may be acquired by measuring a marker from at least two locations. For example, it may be calculated by moving and disposing the marker to at least two marker stages of which the separation distance is given and by measuring the same.

Then, the location conversion matrix [T] is acquired by using the acquired essential matrix [E] and the scale factor (S2250).

More specifically, the location conversion matrix [T] may be calculated by multiplying the matrix (tx,ty,tz)T, which is a 3×1 matrix having the components of tx, ty, and tz among the components of the acquired matrix [t]X, by the scale factor.

Next, the operation S2300 of acquiring the location of the marker part 1110 by using the calibrated location conversion matrix [T] will be described in more detail with reference to the drawings.

Figure 18:
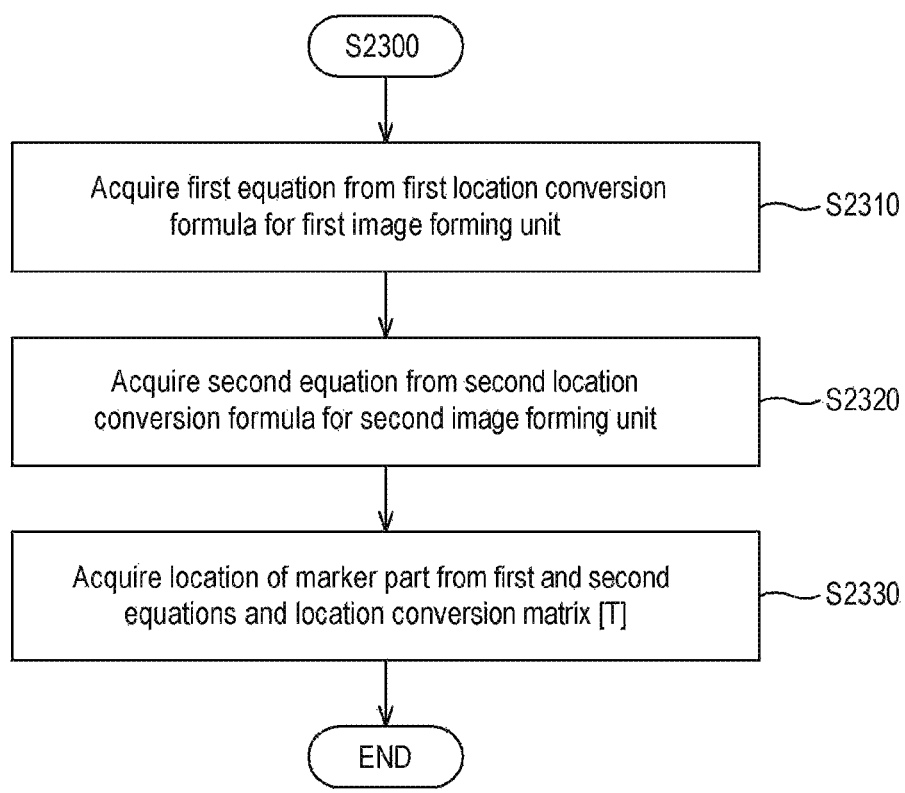
FIG. 18 is a flowchart illustrating an example of a process of acquiring the location of a marker part in the problem-solving process of FIG. 15.

FIG. 18 is a flowchart illustrating an example of a process of acquiring the location of a marker part in the problem-solving process of FIG. 15.

Referring to FIG. 18, first, the first equation is acquired from the first location conversion formula with respect to the first image forming part 1120a (S2310).

More specifically, Equation 23 that is the first location conversion formula is defined as shown in Equation 29.

$$s \begin{bmatrix} u'_1 \\ v'_1 \\ 1 \end{bmatrix} =$$ (Equation 29)

$$A_L[I \mid 0] \begin{bmatrix} X \\ Y \\ Z \\ 1 \end{bmatrix} = \begin{bmatrix} m_{1\_11} & m_{1\_12} & m_{1\_13} & m_{1\_14} \\ m_{1\_21} & m_{1\_22} & m_{1\_23} & m_{1\_24} \\ m_{1\_31} & m_{1\_32} & m_{1\_33} & m_{1\_34} \end{bmatrix} \begin{bmatrix} X \\ Y \\ Z \\ 1 \end{bmatrix}$$

The vector product of Equation 29 by itself on both sides results in zero to then be organized so that Equation 30 corresponding to the first equation may be acquired.

(Equation 30)

$$\begin{bmatrix} m_{i\_11} - u'm_{i\_31} & m_{i\_12} - u'm_{i\_32} & m_{i\_13} - u'm_{i\_33} & m_{i\_14} - u'm_{i\_34} \\ m_{i\_21} - v'm_{i\_31} & m_{i\_22} - v'm_{i\_32} & m_{i\_23} - v'm_{i\_33} & m_{i\_24} - v'm_{i\_34} \end{bmatrix}$$

$$\begin{bmatrix} X \\ Y \\ Z \\ 1 \end{bmatrix} = 0$$

Next, the second equation is acquired from the second location conversion formula with respect to the second image forming unit 1120b (S2320).

More specifically, the Equation 24 that is the second location conversion formula is defined as shown in Equation 31.

$$s \begin{bmatrix} u'_2 \\ v'_2 \\ 1 \end{bmatrix} =$$ (Equation 31)

$$A_R[R_{LR} \mid T] \begin{bmatrix} X \\ Y \\ Z \\ 1 \end{bmatrix} = \begin{bmatrix} m_{2\_11} & m_{2\_12} & m_{2\_13} & m_{2\_14} \\ m_{2\_21} & m_{2\_22} & m_{2\_23} & m_{2\_24} \\ m_{2\_31} & m_{2\_32} & m_{2\_33} & m_{2\_34} \end{bmatrix} \begin{bmatrix} X \\ Y \\ Z \\ 1 \end{bmatrix}$$

The same operation as the operation S2310 of acquiring the first equation is applied to Equation 31 in order to thereby acquire the second equation.

Equation 30 corresponding to the first equation includes two equations, and likewise, the second equation also includes two equations. Therefore, a total of four equations may be acquired to correspond to two image forming units.

Next, the location of the marker part 1110 is acquired from the first and second equations and the location conversion matrix [T] (S2330).

More specifically, the calibrated location conversion matrix [T] may be applied to the first and the second equations in order to thereby acquire the three-dimensional coordinate of the center of the first lens 1114 of the marker part 1110.

Figure 19:
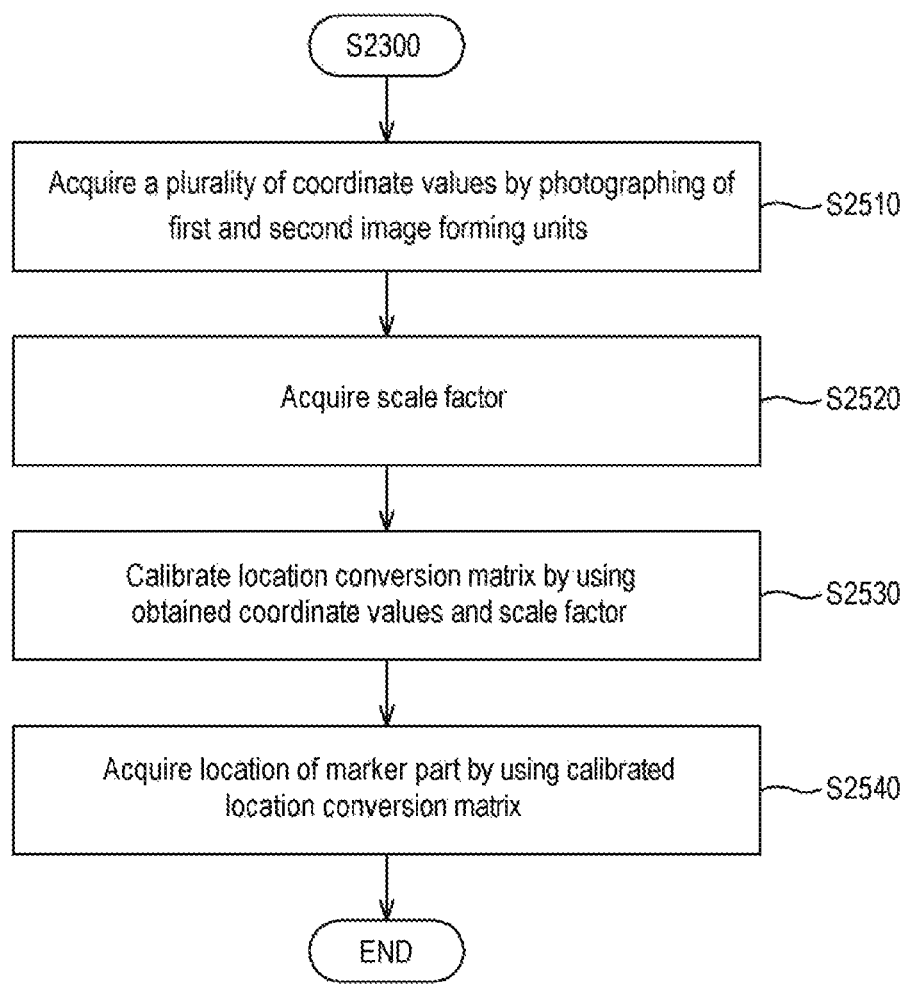
FIG. 19 is a flowchart illustrating another example of a process of acquiring the location of a marker part in the problem-solving process of FIG. 15.

FIG. 19 is a flowchart illustrating another example of a process of acquiring the location of a marker part in the problem-solving process of FIG. 15.

Referring to FIG. 19, first, the third equation is acquired from the first pattern coordinate conversion formula with respect to the first image forming unit 1120a (S2350).

More specifically, the first pattern coordinate conversion formula is configured, which is transformed from the first location conversion formula, as shown in Equation 32.

$$s\begin{bmatrix}u'\\v'\\1\end{bmatrix} = A[R|t][R_m|t_m]\begin{bmatrix}1&0&0&-u_c\\0&1&0&-v_c\\0&0&1&0\\0&0&0&1\end{bmatrix}\begin{bmatrix}u\\v\\f_b\\1\end{bmatrix}$$ (Equation 32)

$$= \begin{bmatrix}m_{i\_11}&m_{i\_12}&m_{i\_13}&m_{i\_14}\\m_{i\_21}&m_{i\_22}&m_{i\_23}&m_{i\_24}\\m_{i\_31}&m_{i\_32}&m_{i\_33}&m_{i\_34}\end{bmatrix}\begin{bmatrix}r_{11}&r_{12}&r_{13}&X\\r_{21}&r_{22}&r_{23}&Y\\r_{31}&r_{32}&r_{33}&Z\\0&0&0&1\end{bmatrix}\begin{bmatrix}u-u_c\\v-v_c\\f_b\\1\end{bmatrix}$$

$$= \begin{bmatrix}m_{i\_11}&m_{i\_12}&m_{i\_13}&m_{i\_14}\\m_{i\_21}&m_{i\_22}&m_{i\_23}&m_{i\_24}\\m_{i\_31}&m_{i\_32}&m_{i\_33}&m_{i\_34}\end{bmatrix}\begin{bmatrix}r_{11}(u-u_c)+r_{12}(v-v_c)+r_{13}f_b+X\\r_{21}(u-u_c)+r_{22}(v-v_c)+r_{23}f_b+Y\\r_{31}(u-u_c)+r_{32}(v-v_c)+r_{33}f_b+Z\\1\end{bmatrix}$$

Equation 33 may be acquired by organizing Equation 32 as an equation.

$(m_{i\_31}u'-m_{i\_11})(u-u_c)r_{11}+(m_{i\_31}u'-m_{i\_11})(v-v_c)r_{12}+$
$(m_{i\_31}u'-m_{i\_11})f_b r_{13}+(m_{i\_31}u'-m_{i\_11})X+(m_{i\_32}u'-$
$m_{i\_12})(u-u_c)r_{21}+(m_{i\_32}u'-m_{i\_12})(v-v_c)r_{22}+$
$(m_{i\_32}u'-m_{i\_12})f_b r_{23}+(m_{i\_32}u'-m_{i\_12})Y+(m_{i\_33}u'-$
$m_{i\_13})(u-u_c)r_{31}+(m_{i\_33}u'-m_{i\_13})(v-v_c)r_{32}+$
$(m_{i\_33}u'-m_{i\_13})f_b r_{33}+(m_{i\_33}u'-m_{i\_13})Z+(m_{i\_34}u'-$
$m_{i\_14})=0$ $(m_{i\_31}v'-m_{i\_21})(u-u_c)r_{11}+(m_{i\_31}v'-m_{i\_21})(v-v_c)r_{12}+$
$(m_{i\_31}v'-m_{i\_21})f_b r_{13}+(m_{i\_31}v'-m_{i\_21})X+(m_{i\_32}v'-$
$m_{i\_22})(u-u_c)r_{21}+(m_{i\_32}v'-m_{i\_22})(v-v_c)r_{22}+$
$(m_{i\_32}v'-m_{i\_22})f_b r_{23}+(m_{i\_32}v'-m_{i\_22})Y+(m_{i\_33}v'-$
$m_{i\_23})(u-u_c)r_{31}+(m_{i\_33}v'-m_{i\_23})(v-v_c)r_{32}+$
$(m_{i\_33}v'-m_{i\_23})f_b r_{33}+(m_{i\_33}v'-m_{i\_23})Z+(m_{i\_34}v'-$
$m_{i\_24})=0$ (Equation 33)

Subsequently, the fourth equation is acquired from the second pattern coordinate conversion formula with respect to the second image forming unit 1120*b* (S2360).

The present operation is substantially the same as the operation S2350 of acquiring the third equation, except that the target is not the first image forming unit 1120*a* but the second imaging forming unit 1120*b*.

Equation 33 corresponding to the third equation includes two equations, and likewise, the fourth equation also includes two equations. Therefore, a total of four equations may be acquired to correspond to two image forming units.

Next, the location of the marker part 1110 is acquired from the third and fourth equations and the location conversion matrix [T] (S2370).

More specifically, the calibrated location conversion matrix [T] may be applied to the third and fourth equations in order to thereby acquire the three-dimensional coordinate of the center of the first lens 1114 of the marker part 1110.

Hereinafter, a method for calculating the location of the marker part 1110 by the processing part 1130 will be described in more detail with reference to the drawings.

Figure 20:
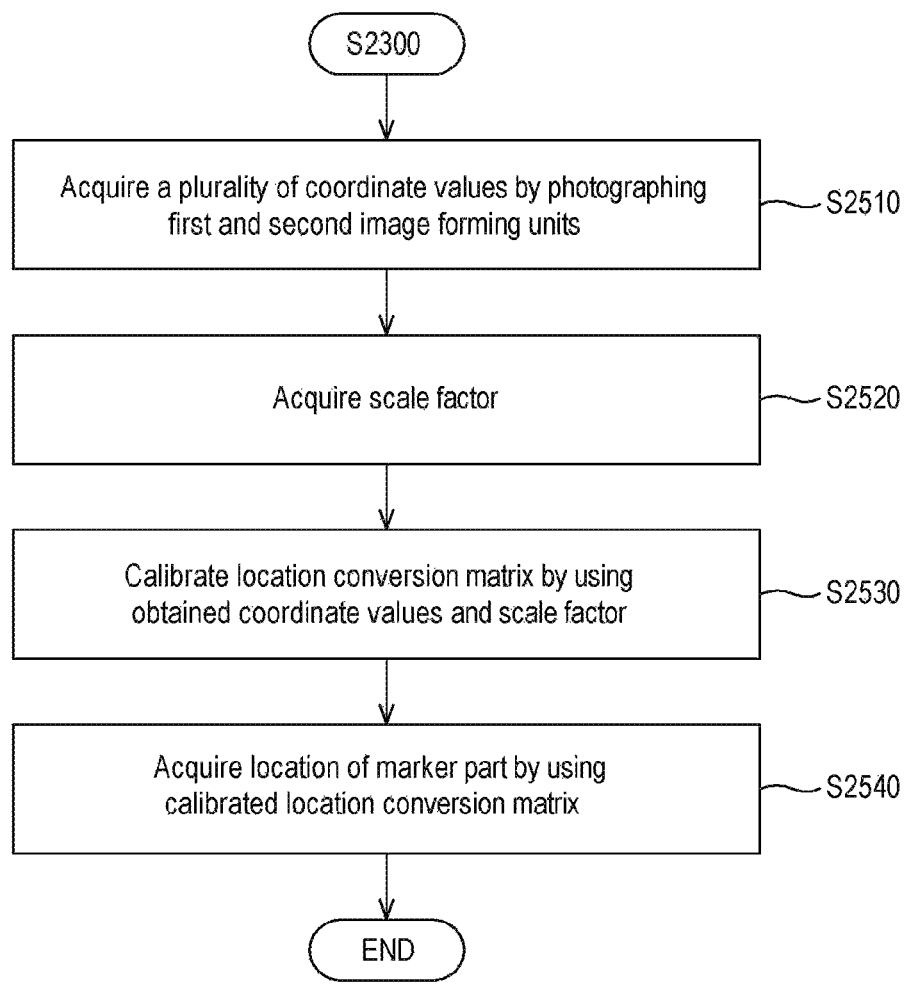
FIG. 20 is a flowchart illustrating a method of calculating the location of a marker part of an optical tracking system, according to an embodiment of the present invention.

FIG. 20 is a flowchart illustrating a method of calculating the location of the marker part of the optical tracking system, according to an embodiment of the present invention.

Referring to FIG. 20, first, a plurality of coordinate values are acquired by photographing of the first and second image forming units 1124*a* and 1124*b* (S2510).

The acquisition of the coordinate values is substantially the same as operation S2210 of acquiring the first central coordinate and the second central coordinate described in FIG. 17, and, for example, eight coordinate values are acquired.

Next, a scale factor is acquired (S2520).

The acquisition of the scale factor is substantially the same as operation S2240 described in FIG. 17.

Then, the location conversion matrix is calibrated by using the acquired coordinate values and scale factor (S2530).

The calibration may be substantially the same as operation S2200 described in FIG. 15 and operation S2250 described in detail in FIG. 17. The processing part 1130 may calibrate the location conversion matrix by using only the final equation for the calibration.

Next, the location of the marker part 1110 is acquired by using the calibrated location conversion matrix (S2540).

The acquisition of the location of the marker part 1110 may be substantially the same as operation S2300 described in FIG. 15, operations S2310 to S2330 described in detail in FIG. 18, or operations S2350 to S2370 described in detail in FIG. 19. The processing part 1130 may use only the final equation for the location acquisition as in operation S2330 or S2370 among the operations above.

According to the optical tracking system as described above, since the location of the marker part can be determined more accurately by modeling the marker part by applying a stereo structure, which is miniaturized while including a pattern of particular information, it is possible to accurately track the marker part by a simpler and easier method.

Although the preferred embodiments of the invention have been described in the detailed description of the invention, those skilled in the art or those who have ordinary knowledge in the art may modify and change the present invention in various manners without departing from the spirit and scope of the present invention in the claims below. Therefore, the description above and the drawings below should be construed to show only examples of the present invention without limiting the technical concept of the present invention.

REFERENCE NUMERALS 100, 1000: Optical tracking system 110, 1110: Marker part
112, 1112: Pattern 114, 1114: First lens
120, 1120: Image forming part 122, 1122: Second lens
124, 1124: Imaging forming unit 130, 1130: Processing part

What is claimed is:
1. An optical tracking system comprising:
a marker configured to include a pattern that has particular information and a first lens that is spaced apart from the pattern and has a first focal length;
a first image lens and sensor combination configured to include a second lens that has a second focal length and a first imaging sensor that is spaced apart from the second lens and on which a first image of the pattern is formed by the first lens and the second lens;
a second image lens and sensor combination configured to include a third lens that has a third focal length and a second image imaging sensor that is spaced apart from the third lens and on which a second image of the pattern is formed by the first lens and the third lens; and a processor configured to determine a posture of the marker from a first coordinate conversion formula between a coordinate on a pattern surface of the pattern and a first pixel coordinate on the first image of the pattern and from a second coordinate conversion formula between the coordinate on the pattern surface of the pattern and a second pixel coordinate on the second image of the pattern, the second coordinate conversion formula including a rotation conversion between the first pixel coordinate and the second pixel coordinate, and configured to track the marker.

2. The optical tracking system according to claim 1, wherein the processor acquires:

the first conversion matrix that converts a first coordinate corresponding to a coordinate on the pattern surface of the pattern to a second coordinate corresponding to a three-dimensional coordinate for the first lens of the marker;

the second conversion matrix that converts a third coordinate corresponding to a three-dimensional coordinate of the second coordinate for the second lens to a fourth coordinate corresponding to the first pixel coordinate on the first image of the pattern of the first image lens and sensor combination;

the third conversion matrix that is the same as the first conversion matrix and converts a fifth coordinate corresponding to a coordinate on the pattern surface of the pattern to a sixth coordinate corresponding to a three-dimensional coordinate for the first lens of the marker; and the fourth conversion matrix that converts a seventh coordinate corresponding to a three-dimensional coordinate of the sixth coordinate for the third lens to an eighth coordinate corresponding to the second pixel coordinate on the second image of the pattern of the second image lens and sensor combination, wherein the first coordinate conversion formula is defined to convert the first coordinate to the fourth coordinate while including the first conversion matrix and the second conversion matrix, and the second coordinate conversion formula is defined to convert the fifth coordinate to the eighth coordinate while including the third conversion matrix and the fourth conversion matrix, and wherein the processor acquires, from the first coordinate conversion formula and the second coordinate conversion formula, a first posture definition matrix that defines the posture of the marker with respect to the first image lens and sensor combination.

3. The optical tracking system according to claim 2, wherein the first coordinate conversion formula is defined by $$s \begin{bmatrix} lu' \\ lv' \\ 1 \end{bmatrix} = [A_l][R_L][C] \begin{bmatrix} lu \\ lv \\ 1 \end{bmatrix},$$

wherein {(lu,lv) denotes the first coordinate, (lu',lv') denotes the fourth coordinate, [C] denotes the first conversion matrix, [$A_l$] denotes the second conversion matrix, [$R_L$] denotes the first posture definition matrix, and s denotes a proportional constant}, and the second coordinate conversion formula is defined by $$s \begin{bmatrix} ru' \\ rv' \\ 1 \end{bmatrix} = [A_r][R_R][C] \begin{bmatrix} ru \\ rv \\ 1 \end{bmatrix} = [A_r][R_{LR}][R_L][C] \begin{bmatrix} ru \\ rv \\ 1 \end{bmatrix},$$

wherein {(ru,rv) denotes the fifth coordinate, (ru',rv') denotes the eighth coordinate, [C] denotes the third conversion matrix, [$A_r$] denotes the fourth conversion matrix, [$R_R$] denotes a second posture definition matrix for defining the posture of the marker with respect to the second image lens and sensor combination, [$R_{LR}$] denotes a third posture definition matrix for defining a posture of the first image lens and sensor combination with respect to the second image lens and sensor combination, and s denotes a proportional constant}.

4. The optical tracking system according to claim 3, wherein the first conversion matrix and the third conversion matrix are defined by $$[C] = \begin{bmatrix} 1 & 0 & -u_c \\ 0 & 1 & -v_c \\ 0 & 0 & f_b \end{bmatrix},$$

wherein {($u_c$,$v_c$) denotes the coordinate of a center of the pattern, and $f_b$ denotes the first focal length}, and the second conversion matrix and the fourth conversion matrix are defined by $$[A] = \begin{bmatrix} -\frac{f_c}{pw} & 0 & u'_c \\ 0 & -\frac{f_c}{ph} & v'_c \\ 0 & 0 & 1 \end{bmatrix},$$

wherein {($u'_c$,$v'_c$) denotes the pixel coordinate on the image of the pattern corresponding to the center of the pattern, $f_c$ denotes the second focal length in the case of the second conversion matrix and denotes the third focal length in the case of the fourth conversion matrix, pw denotes a width of a pixel of the first image of the pattern in the case of the second conversion matrix and denotes a width of a pixel of the second image of the pattern in the case of the fourth conversion matrix, and ph denotes a height of a pixel of the first image of the pattern in the case of the second conversion matrix and denotes a height of a pixel of the second image of the pattern in the case of the fourth conversion matrix}.

5. The optical tracking system according to claim 4, wherein the processor acquires the first conversion matrix and the third conversion matrix by acquiring calibration values of uc, vc, and fb from three or more photographed images, and acquires the second conversion matrix and the fourth conversion matrix by acquiring calibration values of fc, pw, and ph by using the acquired data.

6. The optical tracking system according to claim 3, wherein the processor acquires a plurality of pieces of data on the first coordinate and the fourth coordinate and a plurality of pieces of data on the fifth coordinate and the eighth coordinate, and acquires the first posture definition matrix by the following equation to which the plurality of pieces of the acquired data are applied, $$[R_L] = \begin{bmatrix} r_{11} & r_{12} & r_{13} \\ r_{21} & r_{22} & r_{23} \\ r_{31} & r_{32} & r_{33} \end{bmatrix}$$

$$\begin{bmatrix} LW_1 \\ RW_1 \\ \vdots \\ LW_n \\ RW_n \end{bmatrix} \begin{bmatrix} r_{11} \\ r_{12} \\ r_{13} \\ r_{21} \\ r_{22} \\ r_{23} \\ r_{31} \\ r_{32} \\ r_{33} \end{bmatrix} = 0$$

$$LW_i = \begin{bmatrix} \frac{f_c}{pw}lu_i & \frac{f_c}{pw}lv_i & \frac{f_c}{pw}f_b & 0 & 0 & 0 & (lu'_i - lu'_c)u_i & (lu'_i - lu'_c)v_i & (lu'_i - lu'_c)f_b \\ 0 & 0 & 0 & \frac{f_c}{ph}lu_i & \frac{f_c}{ph}lv_i & \frac{f_c}{ph}f_b & (lv'_i - lv'_c)u_i & (lv'_i - lv'_c)v_i & (lv'_i - lv'_c)f_b \end{bmatrix}$$

$$RW_i = \begin{bmatrix} A1r'_{11} + B1r'_{31} & C1r'_{11} + D1r'_{31} & E1r'_{11} + F1r'_{31} \\ A1r'_{12} + B1r'_{32} & C1r'_{12} + D1r'_{302} & E1r'_{12} + F1r'_{32} \\ A1r'_{13} + B1r'_{33} & C1r'_{13} + D1r'_{33} & E1r'_{13} + F1r'_{33} \\ A2r'_{11} + B2r'_{31} & C2r'_{11} + D2r'_{31} & E2r'_{11} + F2r'_{31} \\ A2r'_{12} + B2r'_{32} & C2r'_{11} + D2r'_{302} & E2r'_{12} + F2r'_{32} \\ A2r'_{13} + B2r'_{33} & C2r'_{13} + D2r'_{33} & E2r'_{13} + F2r'_{33} \end{bmatrix}$$

$$A1 = -\frac{f_c}{pw}ru_i, B1 = ru_i(ru'_c - ru'_i), C1 = -\frac{f_c}{pw}rv_i,$$

$$D1 = rv_i(ru'_c - ru'_i), E1 = -\frac{f_c}{pw}f_b, F1 = f_b(ru'_c - ru'_i)$$

$$A2 = -\frac{f_c}{ph}ru_i, B2 = ru_i(rv'_c - rv'_i), C2 = -\frac{f_c}{ph}rv_i,$$

$$D2 = rv_i(rv'_c - rv'_i), E2 = -\frac{f_c}{ph}f_b, F2 = f_b(rv'_c - rv'_i)$$

$$[R_{LR}] = \begin{bmatrix} r'_{11} & r'_{12} & r'_{13} \\ r'_{21} & r'_{22} & r'_{23} \\ r'_{31} & r'_{32} & r'_{33} \end{bmatrix},$$

wherein {(lu1,lv1), ... , (lun,lvn) denote data of the first coordinate, (lu'1,lv'1), ... , (lu'n,lv'n) denote data on the fourth coordinate, (lu'c,lv'c) denotes the pixel coordinate on the first image of the pattern corresponding to the center of the pattern, (ru1,rv1), ... , (run,rvn) denote data on the fifth coordinate, (ru'1,rv'1), ... , (ru'n,rv'n) denote data on the eighth coordinate, and (ru'c,rv'c) denotes the pixel coordinate on the second image of the pattern corresponding to the center of the pattern}.

7. The optical tracking system according to claim 3, wherein the processor determines the location of the marker from the third coordinate conversion formula for the second coordinate and the fourth coordinate and from the fourth coordinate conversion formula for the sixth coordinate and the eighth coordinate, and tracks the marker by using the determined location of the marker.

8. The optical tracking system according to claim 7, wherein the third coordinate conversion formula is defined by $$s \begin{bmatrix} u'_1 \\ v'_1 \\ 1 \end{bmatrix} = [A_L][I][0] \begin{bmatrix} X \\ Y \\ Z \\ 1 \end{bmatrix},$$

wherein {(u'1,v'1) denotes the fourth coordinate, (X,Y,Z) denotes the second coordinate, [AL] denotes the second conversion matrix, [I] denotes an identity matrix in a 3×3 form, [0] denotes a zero-matrix in a 3×1 form, and s denotes a proportional constant}, and the fourth coordinate conversion formula is defined by $$s \begin{bmatrix} u'_2 \\ v'_2 \\ 1 \end{bmatrix} = [A_R][R_{LR}][T] \begin{bmatrix} X \\ Y \\ Z \\ 1 \end{bmatrix},$$

wherein {(u'2,v'2) denotes the eighth coordinate, (X,Y,Z) denotes the sixth coordinate, [AR] denotes the fourth conversion matrix, [RLR] denotes the third posture definition matrix in a 3×3 form, [T] denotes a location conversion matrix in a 3×1 form, and s denotes a proportional constant}.

9. The optical tracking system according to claim 8, wherein the processor:
acquires a first central coordinate and a second central coordinate, each of which is the center of a field of view of the pattern that is photographed in the first and second imaging sensors, respectively;
calibrates the location conversion matrix between the first image lens and sensor combination and the second image lens and sensor combination by using the acquired central coordinates; and
acquires the location of the marker by using the calibrated location conversion matrix.

10. The optical tracking system according to claim 9, wherein the processor acquires a scale factor by measuring the marker at two or more locations, and calibrates the location conversion matrix between the first image lens and sensor combination and the second image lens and sensor combination by using the acquired scale factor together with the acquired central coordinates.

11. A method for calculating a posture and a location of a marker of an optical tracking system that includes a marker that includes a pattern that has particular information and a first lens that is spaced apart from the pattern and has a first focal length, a first image lens and sensor combination that includes a second lens that has a second focal length and a first imaging sensor that is spaced apart from the second lens and on which a first image of the pattern is formed by the first lens and the second lens, and a second image lens and sensor combination that includes a third lens that has a third focal length and a second imaging sensor that is spaced apart from the third lens and on which a second image of the pattern is formed by the first lens and the third lens, and that calculates the posture of the marker for tracking the marker, the method comprising:
acquiring a first conversion matrix that converts a first coordinate corresponding to a coordinate on a pattern surface of the pattern to a second coordinate corresponding to a three-dimensional coordinate for the first lens of the marker; a second conversion matrix that converts a third coordinate corresponding to a three-dimensional coordinate of the second coordinate for the second lens to a fourth coordinate corresponding to a first pixel coordinate on the first image of the pattern of the first image lens and sensor combination, a third conversion matrix that is the same as the first conversion matrix and converts a fifth coordinate corresponding to a coordinate on the pattern surface of the pattern to a sixth coordinate corresponding to a three-dimensional coordinate for the first lens of the marker, and a fourth conversion matrix that converts a seventh coordinate corresponding to a three-dimensional coordinate of the sixth coordinate for the third lens to an eighth coordinate corresponding to a second pixel coordinate on the second image of the pattern of the second image lens and sensor combination; and
acquiring a posture definition matrix for defining the posture of the marker from a first coordinate conversion formula that converts the first coordinate to the fourth coordinate while including the first conversion matrix and the second conversion matrix and from a second coordinate conversion formula that converts the fifth coordinate to the eighth coordinate while including the third conversion matrix and the fourth conversion matrix.

12. The method according to claim 11, further comprising:
acquiring a first central coordinate and a second central coordinate, each of which is a center of a field of view of the pattern that is photographed in the first and second imaging sensors, respectively;
calibrating the location conversion matrix between the first image lens and sensor combination and the second image lens and sensor combination by using the acquired central coordinates; and
acquiring the location of the marker by using the calibrated location conversion matrix.

13. The method according to claim 12, further comprising acquiring a scale factor by measuring the marker at two or more locations before calibrating the location conversion matrix, wherein the location conversion matrix between the first image lens and sensor combination and the second image lens and sensor combination is calibrated by using the acquired scale factor together with the acquired central coordinates in the calibrating of the location conversion matrix.

* * * * *